US012694524B2

(12) United States Patent
Valbusa et al.

(10) Patent No.: US 12,694,524 B2
(45) Date of Patent: Jul. 28, 2026

(54) TRAINING A MACHINE LEARNING MODEL FOR SIMULATING IMAGES AT HIGHER DOSE OF CONTRAST AGENT IN MEDICAL IMAGING APPLICATIONS

(71) Applicant: BRACCO IMAGING S.P.A., Milan (IT)

(72) Inventors: Giovanni Valbusa, Collereto Giacoca (IT); Sonia Colombo Serra, Collereto Giacoca (IT); Alberto Fringuello Mingo, Collereto Giacoca (IT); Fabio Tedoldi, Collereto Giacoca (IT); Davide Bella, Collereto Giacoca (IT)

(73) Assignee: BRACCO IMAGING S.P.A., Milan (IT)

( * ) Notice: Subject to any disclaimer, the term of this patent is extended or adjusted under 35 U.S.C. 154(b) by 226 days.

(21) Appl. No.: 18/568,454

(22) PCT Filed: Oct. 14, 2022

(86) PCT No.: PCT/EP2022/078668
§ 371 (c)(1),
(2) Date: Dec. 8, 2023

(87) PCT Pub. No.: WO2023/062196
PCT Pub. Date: Apr. 20, 2023

(65) Prior Publication Data
US 2024/0273362 A1 Aug. 15, 2024

(30) Foreign Application Priority Data
Oct. 15, 2021 (EP) ..................................... 21203019

(51) Int. Cl.
*G06T 7/00* (2017.01)
*G06T 11/00* (2026.01)

(52) U.S. Cl.
CPC ............ *G06T 7/0012* (2013.01); *G06T 11/00* (2013.01); *G06T 2207/20081* (2013.01); *G06T 2207/20084* (2013.01)

(58) Field of Classification Search
CPC ................... G06T 7/0012; G06T 11/00; G06T 2207/20081; G06T 2207/20084
See application file for complete search history.

(56) References Cited

U.S. PATENT DOCUMENTS 12,009,061 B2 * 6/2024 Peters ................... G16B 40/20
2007/0127574 A1 6/2007 Yao
(Continued)

FOREIGN PATENT DOCUMENTS

AU 2003237089 B2 1/2009
CN 102512186 B 7/2015
(Continued)

OTHER PUBLICATIONS

International Search Report for application No. PCT/EP2022/078668.
(Continued)

*Primary Examiner* — Kevin Ky
(74) *Attorney, Agent, or Firm* — Bryan A. Santarelli; FisherBroyles, LLP

(57) ABSTRACT

A solution is proposed for training a machine learning model (420) for use in medical imaging applications. A corresponding method (700) comprises providing (703-743; 759-763) sample sets, each comprising a sample baseline image, a sample target image (acquired from a corresponding body-part of a subject to which a contrast agent at a certain dose has been administered) and a sample source dose (corresponding to a different dose of the contrast agent). The machine learning model (420) is trained (744-758) so as to optimize its capability of generating each sample target
(Continued)

image from the corresponding sample baseline image and sample source image. One or more of the sample sets are incomplete, missing their sample source images. Each incomplete sample set is completed (704-742; 759-763) by simulating the sample source image from at least the sample baseline image and the sample target image of the sample set. A computer programs (500) and a computer program products for implementing the method (700) are proposed. Moreover, a computing system (130) for performing the method (700) is proposed.

20 Claims, 14 Drawing Sheets

(56) References Cited

U.S. PATENT DOCUMENTS

| | | | |
|---|---|---|---|
| 2019/0056470 A1* | 2/2019 | Wang | G01R 33/5601 |
| 2019/0108634 A1 | 4/2019 | Zaharchuk et al. | |
| 2019/0313990 A1* | 10/2019 | Sahbaee Bagherzadeh | A61B 6/504 |
| 2019/0378619 A1* | 12/2019 | Meyer | G06N 3/08 |
| 2020/0242756 A1* | 7/2020 | Madabhushi | G06T 7/0012 |
| 2022/0151580 A1* | 5/2022 | Itu | G06T 7/0012 |
| 2022/0343475 A1* | 10/2022 | Zhang | G06T 5/92 |
| 2022/0398704 A1 | 12/2022 | Sun | |
| 2022/0399124 A1* | 12/2022 | Zhao | G16H 10/60 |
| 2024/0037748 A1* | 2/2024 | Caba | G06T 7/11 |
| 2024/0175202 A1* | 5/2024 | Oh | G01J 3/462 |
| 2024/0272045 A1* | 8/2024 | Cho | B01D 15/3809 |
| 2024/0273362 A1* | 8/2024 | Valbusa | G06N 3/088 |
| 2024/0290472 A1* | 8/2024 | Valbusa | G06N 3/0464 |

FOREIGN PATENT DOCUMENTS

| | | |
|---|---|---|
| CN | 112470190 A | 3/2021 |
| CN | 112488951 B | 5/2022 |
| WO | 2006055813 A2 | 5/2006 |
| WO | 2014036473 A1 | 3/2014 |
| WO | 2021061710 A1 | 4/2021 |
| WO | 2022129633 W | 6/2022 |
| WO | 2022129634 W | 6/2022 |
| WO | 2023062202 A1 | 4/2023 |

OTHER PUBLICATIONS

Enhao Gong et al: "Deep learning enables reduced gadolinium dose for contrast-enhanced brain MRI: Deep Learning Reduces Gadolinium Dose", Journal of Magnetic Resonance Imaging, vol. 48, No. 2, Feb. 13, 2018, pp. 330-340 XP055656267, US ISSN: 1053-1807, DOI: 10.1002/jmri.25970 figures 1, 2, 4, 6-8.

Dey Ayon: "Machine Learning Algorithms: A Review", International Journal of Computer Science and Information Technologies, vol. 7, No. 3, May 3, 2016, XP055967000.

Communication re Rule 114(2) (Observations by a Third Party) from the European Patent Office, dated Jan. 15, 2025, for EP Application No. 22805801.2, a counterpart application of U.S. Appl. No. 18/568,441, 5 pgs.

Communication re Rule 94(3) from the European Patent Office, dated Jan. 21, 2025, for EP Application No. 22805801.2, a counterpart application of U.S. Appl. No. 18/568,441, 4 pgs.

Haubold, et al., "Contrast Agent Dose Reduction in Computed Tomography With Deep Learning Using a Conditional Generative Adversarial Network," Imagin Informatics and Artificial Intelligence, European Radiology, vol. 31, 2021, pp. 6087-6095.

International Search Report & Written Opinion mailed Feb. 14, 2023 for Application No. PCT/EP2022/078679, a counterpart application of U.S. Appl. No. 18/568,441, 10 pgs.

Communication re Rule 114(2) (Observations by a Third Party) from the European Patent Office, dated Dec. 22, 2025, for EP Application No. 22801818.2, a counterpart application of U.S. Appl. No. 18/568,454, 6 pgs.

Montalt-Tordera, et al., "Reducing Contrast Agent Dose in Cardiovascular MR Angiography with Deep Learning," J. Magn. Reson. Imaging, vol. 54, 2021, pp. 795-805.

Letter and Response to European Office Action dated May 19, 2025 filed in corresponding foreign application; 54 pgs.

Letter and Response to European Office Action dated Sep. 26, 2025 filed in corresponding foreign application; 22 pgs.

Summons to Attend Oral Proceedings issued Mar. 3, 2026 for EP Application No. 22805801.2, a counterpart application filed in Europe, 8 pgs.

\* cited by examiner

Zero-dose image

Full-dose image

Boosted-dose image

Combined image

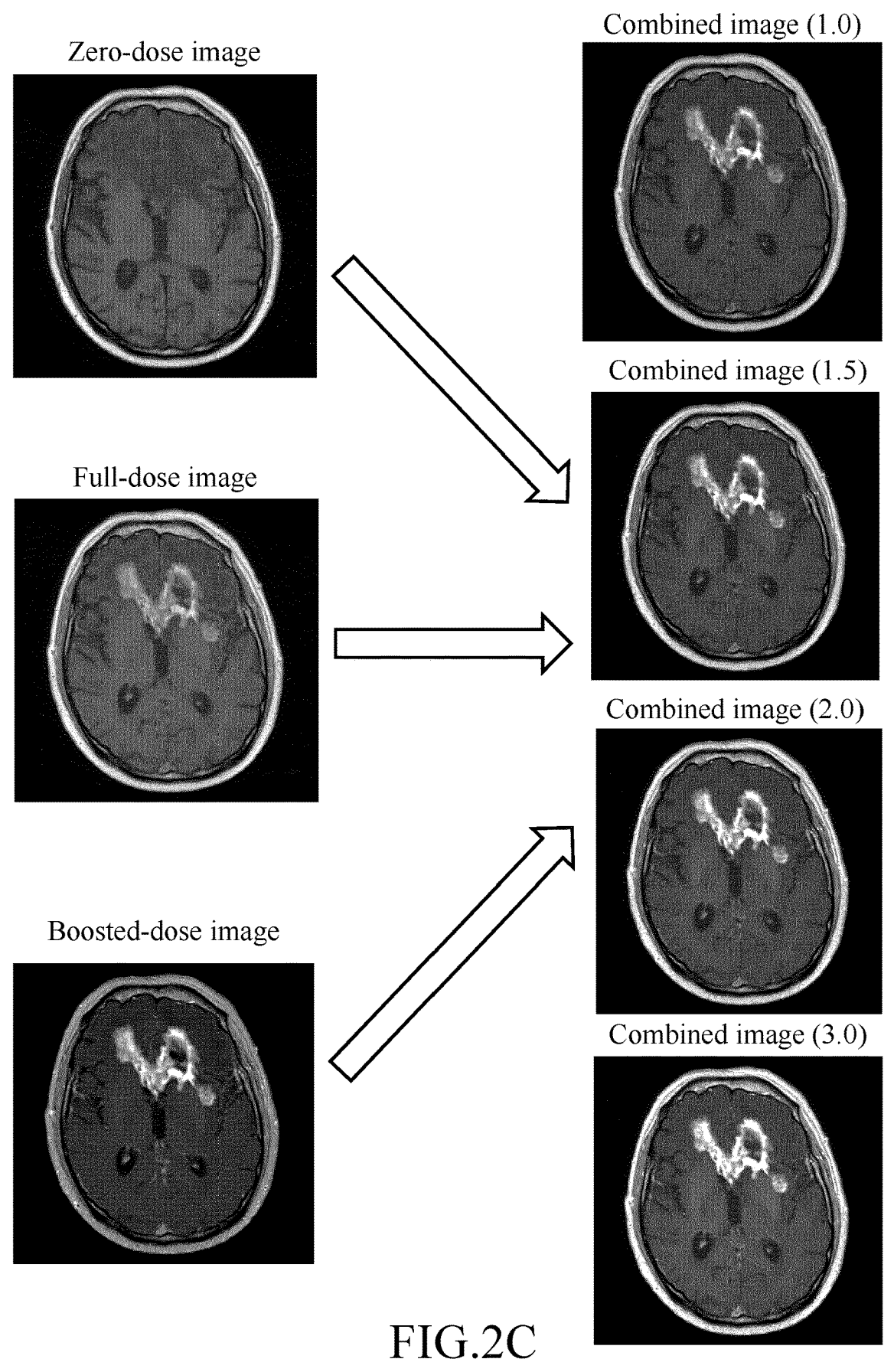

Combined image (1.0)

Zero-dose image

Full-dose image

Combined image (1.5)

Combined image (2.0)

Boosted-dose image

Combined image (3.0)

FIG.2C

Zero-dose image

Full-dose images

Synthesize

Reduced-dose images

Acquired
full-dose image     Training on
clinical data     Training on
pre-clinical data Simulated boosted-dose image Acquired
full-dose image     Training on
clinical data     Training on
pre-clinical data Simulated boosted-dose image

TRAINING A MACHINE LEARNING MODEL FOR SIMULATING IMAGES AT HIGHER DOSE OF CONTRAST AGENT IN MEDICAL IMAGING APPLICATIONS

RELATED APPLICATION DATA

The present application is a U.S National Stage under 35 U.S.C 371 of International Application No. PCT/EP2022/078668, filed on 14 Oct. 2022; which claims priority to EP patent application Ser. No. 21/203,019.1, filed 15 Oct. 2021, the entireties of which are incorporated herewith.

TECHNICAL FIELD

The present disclosure relates to the field of medical imaging applications. More specifically, this disclosure relates to medical imaging applications based on contrast agents.

BACKGROUND ART

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Imaging techniques are commonplace in medical applications to inspect body-parts of patients by physicians through images providing visual representations thereof (typically, in a substantially non-invasive manner even if the body-parts are not visible directly). For this purpose, a contrast agent is typically administered to a patient undergoing a (medical) imaging procedure for enhancing contrast of a (biological) target of interest (for example, a lesion), so as to make it more conspicuous in the images. This facilitates a task of the physicians in several medical applications, for example, in diagnostic applications for discovering/monitoring lesions, in therapeutic applications for delineating lesions to be treated and in surgical applications for recognizing margins of lesions to be resected.

In this context, it has also been proposed to use a reduced-dose of the contrast agent; the reduced-dose is lower than a full-dose of the contrast agent that is standard in clinical practice (such as with the reduced dose equal to $\frac{1}{10}$ of the full-dose). For this purpose, during the imaging procedure a (zero-dose) image of the body-part is acquired before administration of the contrast agent and one or more (reduced-dose) images of the body-part are acquired after administration of the reduced-dose of the contrast agent to the patient. Corresponding (full-dose) images of the body-part, mimicking administration of the full-dose of the contrast agent to the patient, are then simulated from the zero-dose image and the corresponding reduced-dose images by means of a Deep Learning Network (DLN); the deep learning network restores the contrast enhancement from its level in the reduced-dose images (being inadequate because of the reduced-dose of the contrast agent) to the desired level that would have been provided by the contrast agent at the full-dose. The deep learning network is trained by using sample sets each comprising a zero-dose image, a reduced-dose image and a full-dose image of a body-part of the same type being acquired before administration of the contrast agent, after administration of the reduced-dose of the contrast agent and after administration of the full-dose of the contrast agent to a corresponding patient (or two or more zero-dose images acquired under different acquisition conditions or two or more reduced-dose images acquired with different reduced-doses of the contrast agent). For example, "Enhao Gong et al., Deep learning enables reduced gadolinium dose for contrast-enhanced brain MRI, Journal of Magnetic Resonance Imaging, vol. 48, no. 2, 13 Feb. 2018, pages 330-340" discloses the training of a deep learning model for reducing Gadolinium dose in contrast-enhanced brain MRI, wherein the model is trained with images acquired under three different conditions: pre-contrast, post contrast with 10% low-dose and post contrast with 100% full-dose.

The reduced-dose images (or the zero-dose images under different acquisition conditions) required to train the deep learning network are not normally acquired in standard clinical practice. Therefore, the collection of the sample sets requires corresponding prospective studies during which imaging procedures are performed with dedicated imaging protocols deviating from a standard of care. Particularly, a corresponding number of prospective studies have to be performed for each desired reduction of the dose of the contrast agent and for each type of body-part of interest.

However, the prospective studies require relatively complex procedures for obtaining corresponding authorizations by relevant health authorities (approving their deviation from the standard of care). Moreover, the corresponding modifications of the imaging procedures impact clinical workflows, thereby potentially causing delays, technical difficulties, additional costs and risks for the patients (especially when the acquisition of the additional images being normally not required in the imaging procedures may be dangerous for the patients, for example, when it requires exposing the patients to unneeded radiations).

The need of prospective studies also limits the number of sample sets of (zero-dose/reduced-dose/full-dose) images being available and the diversity of the conditions under which they have been acquired. The resulting relatively low amount and diversity of the sample sets reduce the quality of the training of the deep learning network. The reduced quality of the training of the deep learning network has a negative impact on its robustness, and particularly on its capability of predicting the full-dose images. This adversely affects the task of the physicians, with corresponding risks for the health of the patients (for example, false positives/negatives or wrong follow-up in diagnostic applications, reduced effectiveness of therapies or damages to healthy tissues in therapeutic applications and incomplete resection of lesions or excessive removal of healthy tissues in surgical applications).

Document "Johannes Haubold et al., Contrast agent dose reduction in computed tomography with deep learning using a conditional generative adversarial network, European Radiology (2021) 31:6087-6095" discloses the simulation of images with reduced Ioding-based contrast media (ICM) to validate the possibility of virtually enhancing the ICM. For this purpose, dual-energy computed tomography (CT) images based on the ICM are acquired. Isolated ICM images are generated encoding the distribution of the ICM, and they are used to create virtual non-contrast (VCN) images. Dual-energy CT images corresponding to the reduced ICM (by 50% or 80%) are simulated via proportional subtraction. Pairs of input images and target images are obtained by combining the reduced ICM images and the isolated ICM images, respectively, with the VCN images. A generative adversarial network (to be used to simulate ICM enhancement for validating it) is trained with the pairs of input/target images.

WO-A-2022/129633 (filed on 20 Dec. 2021 claiming a priority date of 18 Dec. 2020, and published on 23 Jun. 2022) discloses the training of a convolutional neural network (CNN) to be used to generate a perfusion map from a sequence of perfusion images. For this purpose, a training base is provided formed by sequences of perfusion images and associated perfusion maps. The training base is enriched with corresponding degraded versions of one or more sequences of perfusion images still associated with the corresponding perfusion maps. The training base so enriched is then used to train the neural network. These degraded sequences of perfusion images are generated by simulating lower doses of a corresponding contrast product. Particularly, each value of the degraded sequences of perfusion images is calculated by applying a formula depending on its original value, the corresponding values over time and a reduction factor of the contrast product.

WO-A-2022/129634 (filed on 20 Dec. 2021 claiming a priority date of 18 Dec. 2020, and published on 23 Jun. 2022) discloses the training of a prediction model to be used for predicting injection parameters providing a desired quality level when used to acquire contrast images with administration of a contrast agent. For this purpose, training images are provided comprising pre-contrast/contrast images associated with corresponding reference values of the injection parameters used to acquire them and reference quality levels determined manually. Each pre-contrast image is applied to the prediction model for determining corresponding candidate values of the injection parameters, and there is verified whether a theoretical contrast image that would be acquired with the candidate values of the injection parameters has the target quality level. The verification is direct if a corresponding contrast image exists. Otherwise, the theoretical contrast image is simulated via a generator model and its quality level is determined via a classification model.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of simulating images for the training of a Machine Learning (ML) model.

Particularly, an aspect provides a method for training a machine learning model for use in medical imaging applications. The method comprises providing sample sets, each comprising a sample baseline image, a sample target image (acquired from a corresponding body-part of a subject to which a contrast agent at a certain dose has been administered) and a sample source dose (corresponding to a different dose of the contrast agent). The machine learning model is trained so as to optimize its capability of generating each sample target image from the corresponding sample baseline image and sample source image. One or more of the sample sets are incomplete, missing their sample source images. Each incomplete sample set is completed by simulating the sample source image from at least the sample baseline image and the sample target image of the sample set.

A further aspect provides a computer program for implementing the method.

A further aspect provides a corresponding computer program product.

A further aspect provides a computing system for implementing the method.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, such as value, content and representation). Particularly:

FIG. 2A-FIG. 2E show different exemplary scenarios relating to an imaging procedure according to an embodiment of the present disclosure.

DETAILED DESCRIPTION

Figure 1:
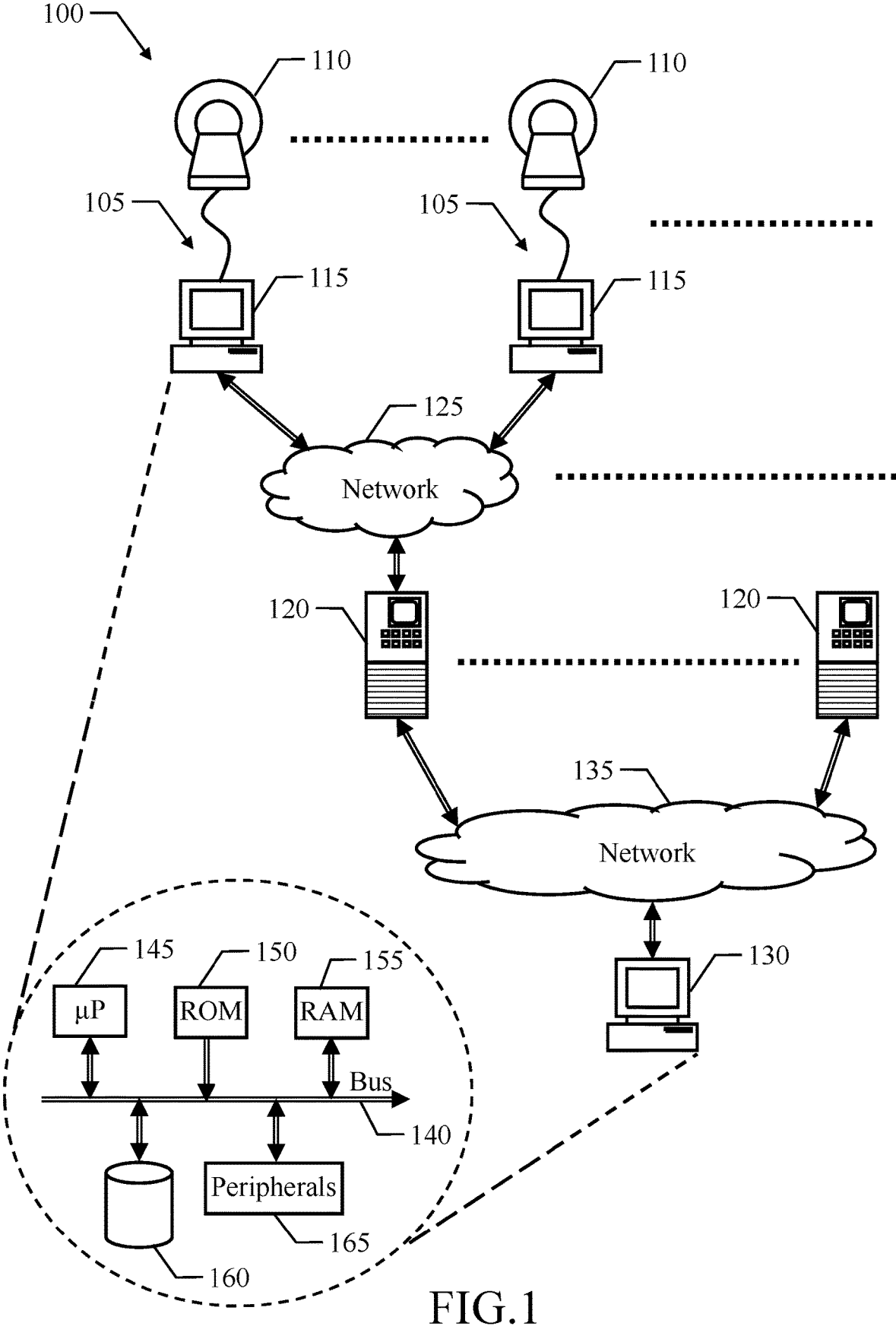
FIG. 1 shows a schematic block diagram of an infrastructure that may be used to practice the solution according to an embodiment of the present disclosure.

With reference in particular to FIG. 1, a schematic block diagram is shown of an infrastructure 100 that may be used to practice the solution according to an embodiment of the present disclosure.

The infrastructure 100 comprises the following components.

One or more (medical) imaging systems 105 comprise corresponding scanners 110 and control computing systems, or simply control computers 115. Each scanner 110 is used to acquire images representing body-parts of patients during corresponding (medical) imaging procedures based on administration thereto of a contrast agent for enhancing contrast of a corresponding (biological) target, such as a lesion. For example, the scanner 110 is of Magnetic Resonance Imaging (MRI) type. In this case, not represented in the figure, the (MRI) scanner 110 has a gantry for receiving a patient; the gantry houses a superconducting magnet (for generating a very high stationary magnetic field), multiple sets of gradient coils for different axes (for adjusting the stationary magnetic field) and an RF coil (with a specific structure for applying magnetic pulses to a type of body-part and for receiving corresponding response signals). As an alternative, the scanner 110 is of Computed Tomography (CT) type. In this case, again not represented in the figure, the (CT) scanner 110 has a gantry for receiving a patient; the gantry houses an X-ray generator, an X-ray detector and a motor for rotating them around a body-part of the patient. The corresponding control computer 115, for example, a Personal Computer (PC), is used to control operation of the scanner 110. For this purpose, the control computer 115 is coupled with the scanner 110. For example, in case the scanner 110 is of MRI type the control computer 115 is arranged outside a scanner room used to shield the scanner 110 and it is coupled with it via a cable passing through a penetration panel, whereas in case the scanner 110 is of CT type the control computer 110 is arranged close to it.

The imaging systems 105 are installed at one or more health facilities (for example, hospitals), which are provided with corresponding central computing systems, or simply central servers 120. Each central server 120 communicates with the control computers 115 of its imaging systems 105 over a network 125, for example, a Local Area network (LAN) of the health facility. The central server 120 gathers information about the imaging procedures that have been performed by the imaging systems 105, each comprising an (image) sequence of images representing the corresponding body-part and additional information relating to the imaging procedure, for example, identification of the patient, result of the imaging procedure, acquisition parameters of the imaging procedure and so on.

A configuration computing device 130, or simply configuration computer 130 (or more) is used to configure the control computers 115 of the imaging systems 105. The configuration computer 130 communicates with the central servers 120 of all the health facilities over a network 135, for example, based on the Internet. The configuration computer 130 collects the image sequences with the corresponding imaging parameters (anonymously) of the imaging procedures that have been performed in the health facilities, for their use to configure the control computers 115 of the imaging systems 105.

Each of the control computers 115 and the configuration computer 130 comprises several units that are connected among them through a bus structure 140. Particularly, a microprocessor (μP) 145, or more, provides a logic capability of the (control/configuration) computer 115,130. A non-volatile memory (ROM) 150 stores basic code for a bootstrap of the computer 115,130 and a volatile memory (RAM) 155 is used as a working memory by the microprocessor 145. The computer 115,130 is provided with a mass-memory 160 for storing programs and data, for example, a Solid-State Disk (SSD). Moreover, the computer 115,130 comprises a number of controllers 165 for peripherals, or Input/Output (I/O), units. Particularly, as far as relevant to the present disclosure, the peripherals comprise a keyboard, a mouse, a monitor, a network adapter (NIC) for connecting to the corresponding network 125,135, a drive for reading/writing removable storage units (such as USB keys) and, for each control computer 115, a trackball and corresponding drives for relevant units of its scanner 110.

With reference now to FIG. 2A-FIG. 2E, different exemplary scenarios are shown relating to an imaging procedure according to an embodiment of the present disclosure.

During each imaging procedure, the corresponding scanner acquires an image sequence of (operative) acquired images representing a body-part of a patient under examination. The acquired images comprise an (operative) baseline image (or more) and one or more (operative) administration, or low-dose, images. For example, the baseline image is acquired from the body-part without contrast agent, and then hereinafter it is referred to as (operative) zero-dose image. The administration images are acquired from the body-part of the patient to which the contrast agent has been administered at an (operative) administration-dose, or low-dose. The control computer associated with the scanner simulates (or synthesizes) corresponding (operative) simulation, or high-dose, images from the zero-dose image and the administration images (for example, by means of a neural network suitably trained for this purpose as described in detail in the following). The simulation images mimic administration to the patient of the contrast agent at an (operative) simulation-dose, or high-dose, that is higher than the administration-dose, i.e., with an increasing factor (given by a ratio between the simulation-dose and the administration-dose) higher than one. A representation of the body-part based on the simulation images is then output (for example, by displaying them) to a physician in charge of the imaging procedure.

The simulation-dose of the contrast agent may be equal to a value that is standard in clinical practice; in this case, the simulation-dose and the simulation images are referred to as (operative) full-dose and (operative) full-dose images. Therefore, the administration-dose is reduced with respect to the full-dose; in this case, the administration-dose and the administration images are referred to as (operative) reduced-dose and (operative) reduced-dose images. The simulation of the full-dose images from the reduced-dose images restores the contrast enhancement that would have been obtained normally with the administration of the contrast agent at the full-dose. This is especially useful when the administration of the contrast agent at the full-dose to the patient may be dangerous (for example, for children, pregnant women, patients affected by specific pathologies, like renal insufficiency, and so on). Particularly, the reduced-dose of the contrast agent that is administered to the patient avoids any prolonged follow-up of its possible effects; at the same time, the full-dose of the contrast agent that is mimicked substantially maintains unaltered a contrast enhancement of the full-dose images that are provided to the physician (if not increasing it by reducing motion/aliasing artifacts that might be caused by the actual administration of the contrast agent at the full-dose).

More generally, the inventors have surprisingly found out that the increasing factor may be applied to any administration-dose for mimicking the corresponding simulation-dose of the contrast agent, even different from the ones used to train the neural network.

Figure 2A:
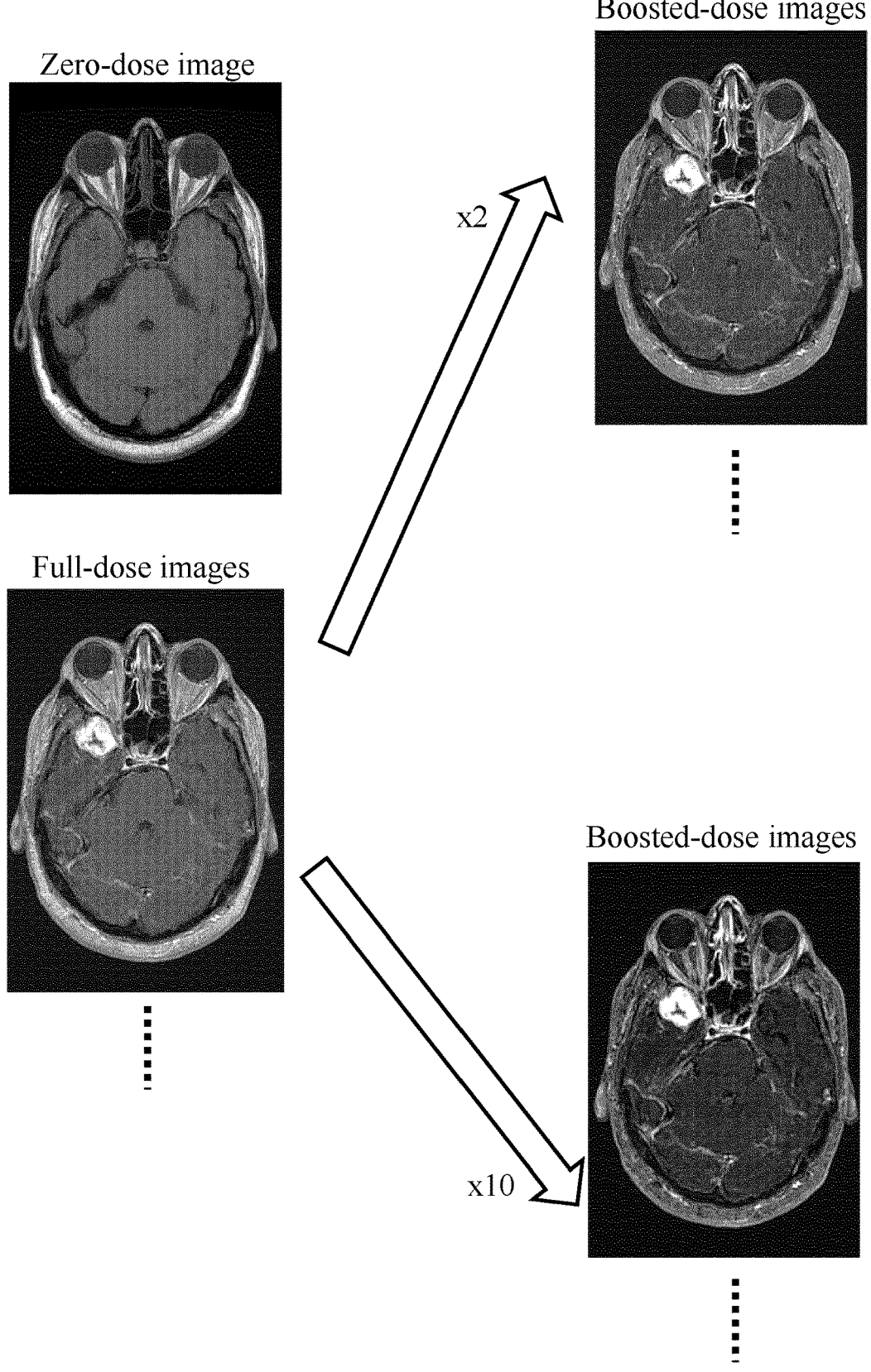

Particularly, with reference to FIG. 2A, in the solution according to an embodiment of the present disclosure the administration-dose is equal to the full-dose. Therefore, the simulation-dose is boosted with respect to the full-dose; in this case, the simulation-dose and the simulation images are referred to as (operative) boosted-dose and (operative) boosted-dose images. The simulation of the boosted-dose images from the full-dose images increments the contrast enhancement as if the boosted-dose images were acquired with the administration of the contrast agent at a (virtual)

dose higher than the one attainable in current clinical practice. For example, the figure shows a zero-dose image, a full-dose image and two different boosted-dose images (simulated with increasing factor ×2 and ×10, respectively). This facilitates a task of the physician. Particularly, the boosted-dose of the contrast agent (higher than the full-dose) that is mimicked substantially increases the contrast enhancement in the boosted-dose images that are provided to the physician (with reduced motion/aliasing artifacts that might instead be caused by the actual administration of the contrast agent at the boosted-dose, when possible); at the same time, the full-dose of the contrast agent that is administered to the patient does not affect the standard of care and does not impact clinical workflows. This is especially advantageous when the contrast enhancement is too poor (for example, when the target involves a relatively low accumulation of the contrast agent therein, such as in some pathologies like low-grade tumors). In any case, the proposed solution makes the target of the imaging procedure more conspicuous, thereby making it distinguishable from other nearby (biological) features in an easier and faster way (especially when the physician has low expertise and/or is overloaded). This has a beneficial effect on the quality of the imaging procedure, for example, substantially reducing the risk of false positives/negatives and wrong follow-up in diagnostic applications, the risk of reduced effectiveness of therapies or of damages to healthy tissues in therapeutic applications and the risk of incomplete resection of lesions or excessive removal of healthy tissues is surgical applications.

As a further improvement, the value of the increasing factor may be selected, for example, among a plurality of pre-defined discrete values thereof (such as ×2, ×5, ×10 and so on) or continuously within a pre-defined range (such as from ×2 to ×20). This adds further flexibility. In fact, in each imaging procedure the physician may use the value of the increasing factor that is best suited for the specific condition (such as patient, body-part, contrast agent, target and so on). Moreover, the physician may also verify the effects of the different values of the increasing factor in real-time, and then select the one that provides the best contrast enhancement. This further increases the quality of the corresponding imaging procedure (for example, even more reducing the above-mentioned risks).

Figure 2B:
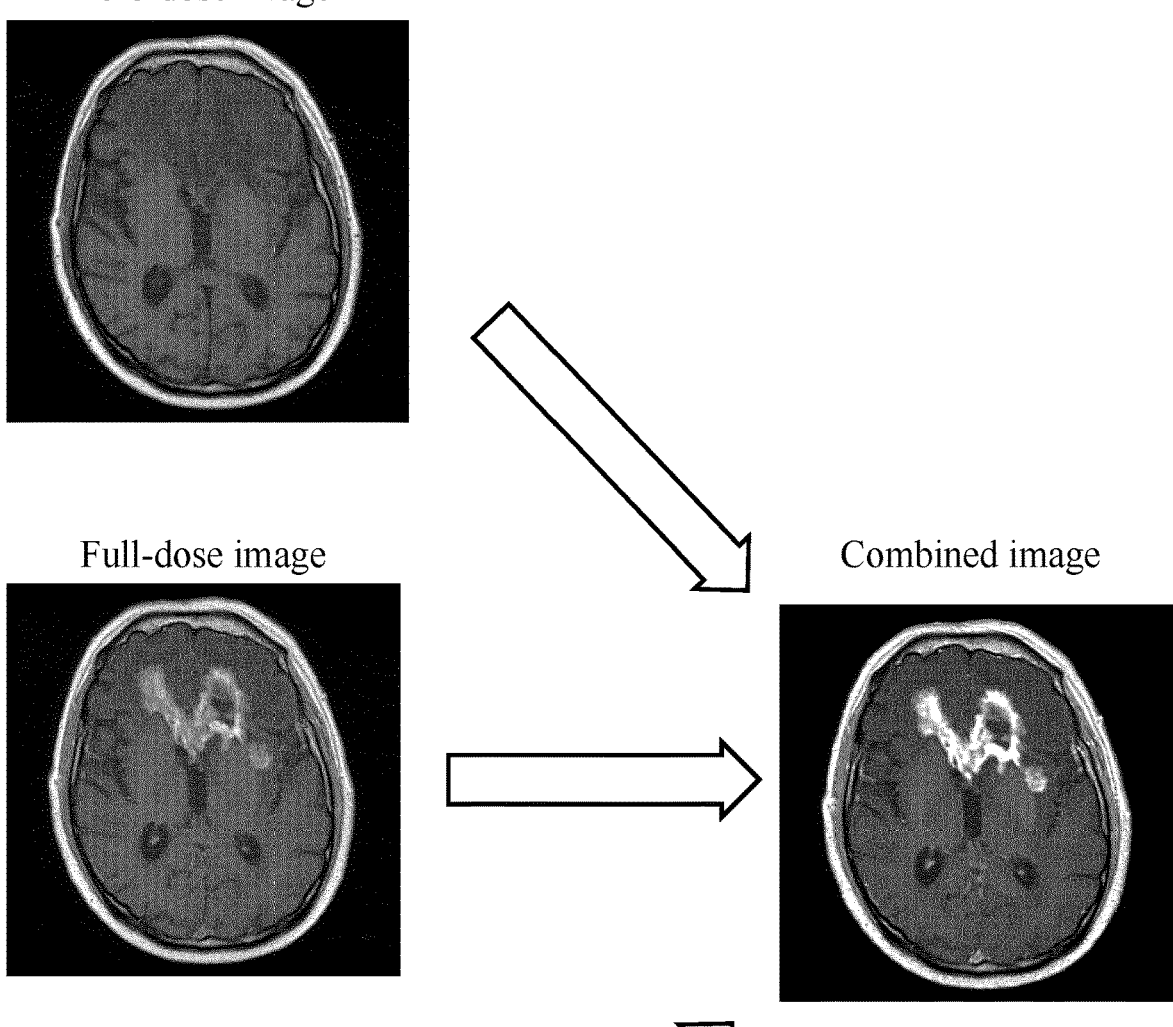
Figure 2B:
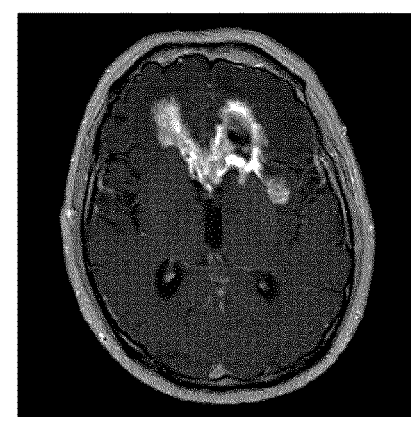
Figure 2B:
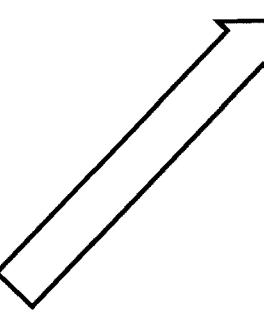

Moving now to FIG. 2B, (operative) combined images may also be generated by applying High Dynamic Range (HDR) techniques. In general terms, HDR techniques are used in photography/videography applications to increase a contrast of images (either increasing or not their dynamic range). For this purpose, multiple images of a same scene are acquired with different exposures; because of a limited dynamic range of the images, they allow differentiation only within corresponding limited ranges of luminosity (i.e., bright particulars with low exposures and dark particulars with high exposures). The images are then combined, with each one of them mainly contributing in the areas where they provide best contrast.

In this case, the same HDR techniques are instead used to generate each combined image from the zero-dose image (being acquired), a full-dose image (being acquired) and the corresponding boosted-dose image (being simulated therefrom). Generally, the zero-dose image has a low luminosity, the boosted-dose image has a high luminosity and the full-dose image has an intermediate luminosity. Therefore, the contribution to the combined image is mainly due to the zero-dose image in the darkest areas, to the boosted-dose image in the brightest areas and to the full-dose image otherwise. This allows obtaining both good contrast of the target with the contrast agent (mainly due to the contribution of the boosted-dose image) and good anatomical details of a rest of the body-part without the contrast agent (mainly due to the zero-dose image); therefore, the target is made more conspicuous at the same time remaining well contextualized on a morphology of the body-part (thereby further improving the quality of the imaging procedure).

Moving to FIG. 2C, the contribution of the boosted-dose image to the combined image may also be modulated. In fact, the combined image reduces the increment of the contrast enhancement. In any case, the contrast enhancement in the combined image may be increased by giving more importance to the contribution of the boosted-dose image thereto (with respect to the one of the zero-dose image and of the full-dose image). For example, the figure shows different combined images that are obtained from corresponding zero-dose image, full-dose image and boosted-dose image (increasing factor equal to 4) with different (relative) contributions of the boosted-dose image, i.e., 1.0, 1.5, 2.0 and 3.0, with respect to the contributions of the zero-dose image and of the full-dose image. As can be seen, the contrast (between the target and the nearby features) increases with the contribution of the boosted-dose image to the combined image.

Figure 2D:
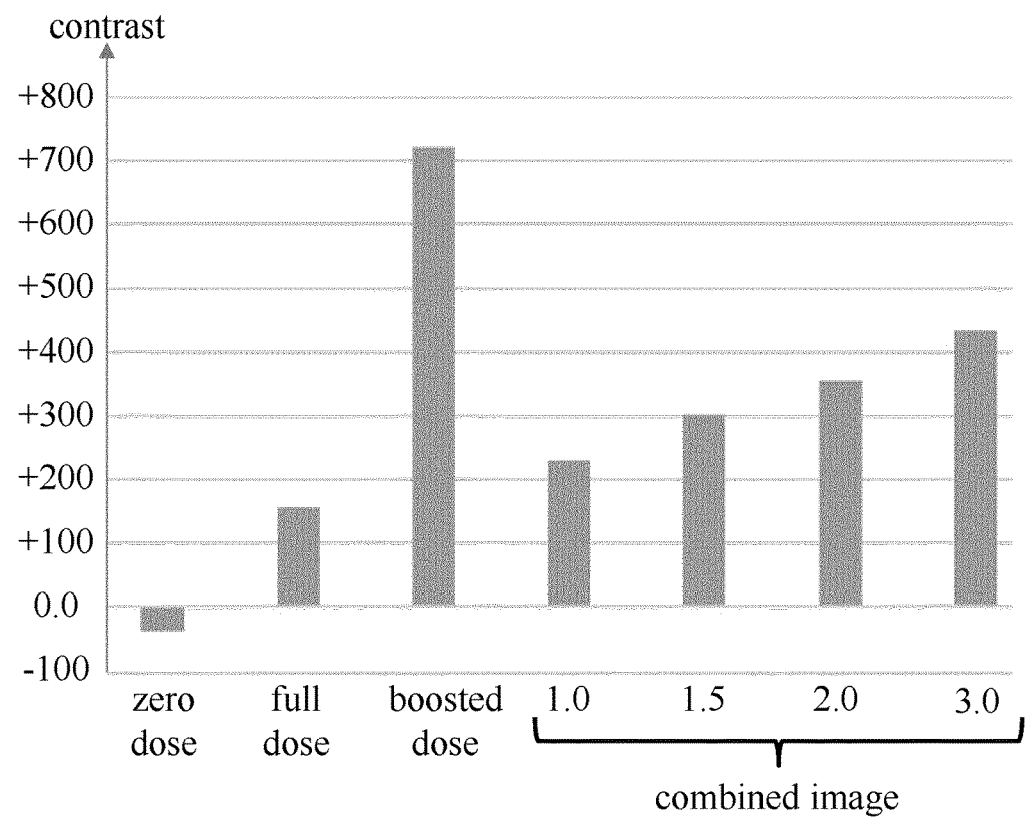

Moving to FIG. 2D, a diagram is shown plotting, in arbitrary units on the ordinate axis, a contrast indicator given by a difference between an average value of a region with a tumor and an average value of a region with healthy tissue in the same (zero-dose/full-dose/boosted-dose/combined) images of above, on the abscissa axis. In the zero-dose image, the contrasts indicator is almost null (slightly negative in the example at issue where the tumor appears darker than the healthy tissue). In the full-dose image, the contrast indicator increases (becoming positive). In the boosted-dose image, the contrast indicator is far higher according to the increasing factor (×4). In the combined images, the contrast indicator decreases with respect to the boosted-dose image. However, the higher the contribution of the boosted-dose image to the combined image the higher the corresponding contrast indicator (in this specific case, always exceeding the contrast indicator of the full-dose image).

Figure 2E:
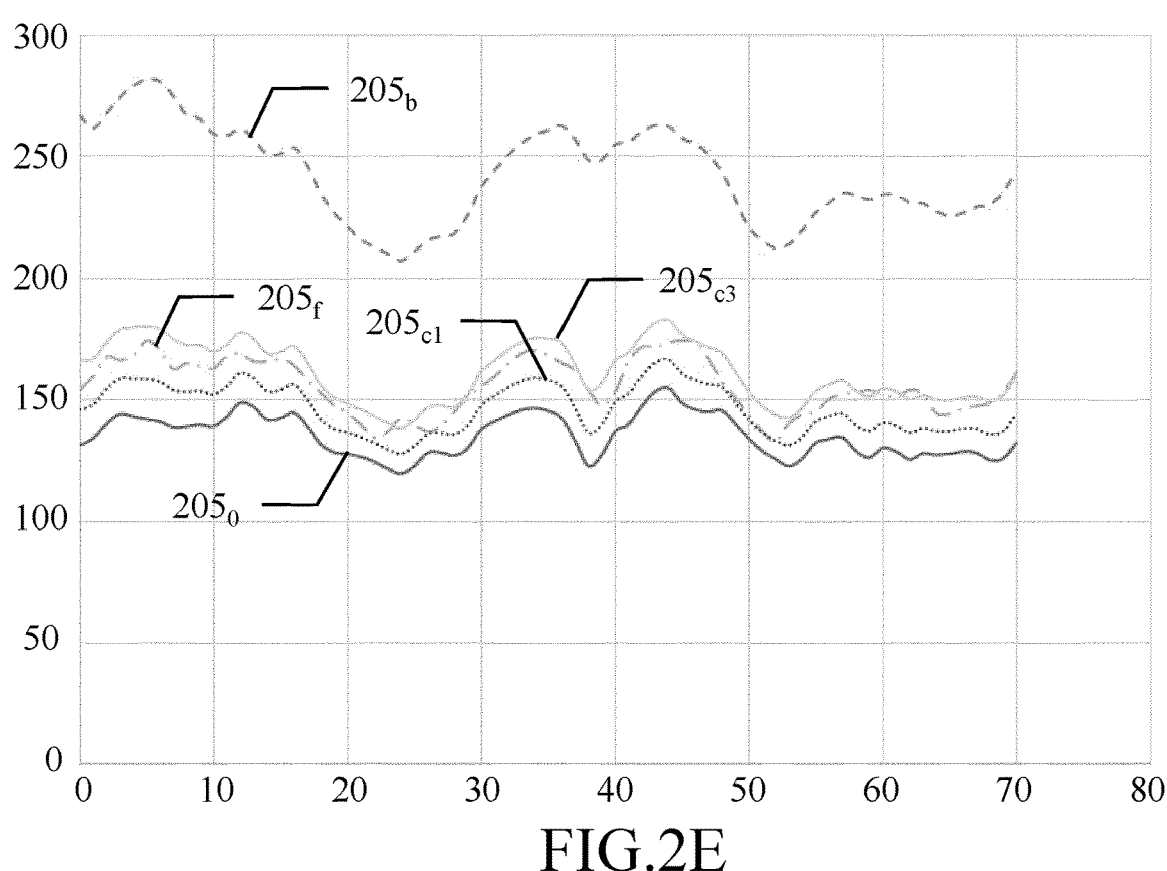

Moving to FIG. 2E, a further diagram is shown plotting, in arbitrary units on the ordinate axis, the values along a generic line crossing a region with healthy tissue (on the abscissa axis) in some of the images of above; particularly, a curve $205_0$ relates to the zero-dose image, a curve $205_f$ relates to the full-dose image, a curve $205_b$ relates to the boosted-dose image, a curve $205_{c1}$ relates to the combined image with the lowest contribution to the boosted-dose image (1.0) and a curve $205_{c3}$ relates to the combined image with the highest contribution to the boosted-dose image (3.0). As can be seen, a spread of the values in the boosted-dose image (curve $205_b$) is reduced with respect to the spread of the values in the zero-dose image (curve $205_0$) and in the full-dose image (curve $205_f$). This means that the boosted-dose image involves a degrade of the anatomical details of the healthy tissue. However, the spread of the values in the combined images (curves $205_{c1}$ and $205_{c3}$) is substantially the same as the spread of the values in the zero-dose/full-dose images (curves $205_0$ and $205_f$), independently of the contributions of the boosted-dose image to the combined images (from 1.0 to 3.0 in the example at issue). This means that the combined images restore the anatomical details of the healthy tissue, even when the contribution thereto of the boosted-dose images is relatively high.

Figure 3:
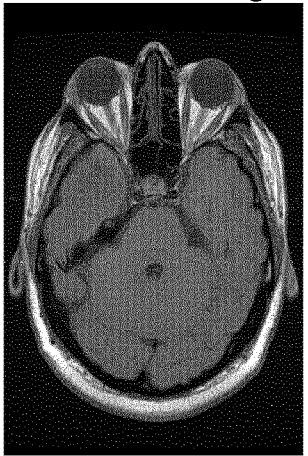
FIG. 3 shows an exemplary scenario relating to a training procedure according to an embodiment of the present disclosure.
Figure 3:
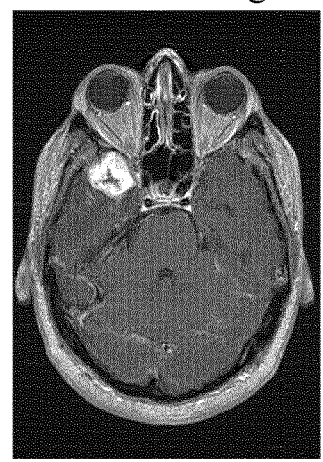
Figure 3:
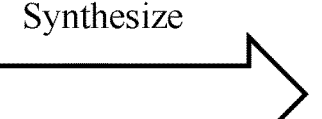
Figure 3:
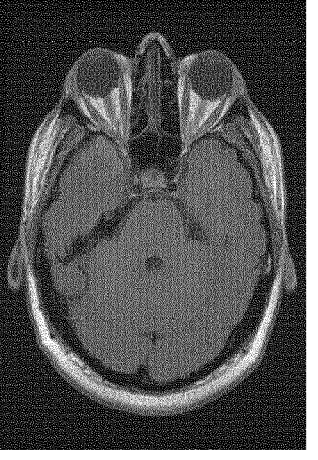

With reference now to FIG. 3, an exemplary scenario is shown relating to a training procedure according to an embodiment of the present disclosure.

The neural network is trained by using a plurality of sample sets (of sample images) representing corresponding body-parts of different subjects, for example, body-parts of further patients of the same type of the body-parts to be imaged. Each sample set comprises a (sample) baseline, image, a (sample) source images and a (sample) target image. The baseline images are (sample) zero-dose images that have been acquired from the corresponding body-parts without the contrast agent. The sample target images have been acquired from the corresponding body-parts of the subjects to which the contrast agent has been administered at a (sample) target-dose. The source images correspond to a (sample) source-dose of the contrast agent that is lower than the target-dose; a ratio between the source-dose and the target-dose is equal to a decreasing factor corresponding to an inverse of the desired increasing factor of the neural network (for example, equal thereto).

The source images as well may have been acquired from the corresponding body-parts of the subjects to which the contrast agent has been administered at the source-dose (for example, in pre-clinical studies). However, in an embodiment of the present disclosure at least part of the sample sets are received without the corresponding source images (hereinafter, the sample sets already comprising all their sample images are referred to as complete sample sets and the sample sets missing their source images are referred to as incomplete sample sets). The source image of each incomplete sample set is instead simulated (or synthesized) from the other (acquired) sample images of the incomplete sample set, i.e., the zero-dose image and the target image (for example, analytically), so as to mimic administration to the subject of the contrast agent at the source-dose.

The sample sets (either being completed or received already completed) are then used to train the neural network, so as to optimize its capability of generating the target image (ground truth) of each sample set from the zero-dose image and the source image of the sample set (for example, by using part of the sample sets to determine a corresponding configuration of the neural network and another part of the sample sets to verify it).

For example, the target images are acquired from the corresponding body-parts of the subjects to which the contrast agent has been administered at the full-dose, and then hereinafter they are referred to as (sample) full-dose images. The source-dose is then reduced with respect to the full-dose; in this case, the source-dose and the source images are referred to as (sample) reduced-dose and (sample) reduced-dose images.

The above-described solution significantly facilitates the training of the neural network.

Particularly, this mainly requires the actual acquisition of only the zero-dose images and the full-dose images. Therefore, it is possible to use the zero-dose images and the full-dose images that are normally acquired in standard clinical practice.

As a consequence, the training of the neural network may be performed mainly with sample images of the incomplete sample sets that are collected retrospectively from imaging procedures being performed in the past. Therefore, the collections of the incomplete sample sets does not affect the standard of care, so that they are more acceptable because at lower risk for the patients (for example, by corresponding authorities such as ethics committees or institutional review boards).

The acquisition of the incomplete sample sets does not impact clinical workflows, thereby reducing any delays, technical difficulties, additional costs and risks for the patients. Particularly, this avoids (or at least substantially reduces) acquiring additional images that are normally not required in the imaging procedures, especially important when the acquisition of these additional images may be dangerous for the patients (for example, when it requires exposing them to unneeded radiations).

Moreover, a relatively high number of incomplete sample sets are available, of the order of thousands if not millions (as normally gathered over decades by many health facilities). The incomplete sample sets are also generally acquired under several conditions (for example, different scanners, types of patients, conditions of the body-parts and so on). The resulting relatively high amount and diversity of the corresponding sample sets being completed increase the quality of the training of the neural network. The increased quality of the training of the neural network has a positive impact on its robustness, and particularly on its capability of predicting the (operative) administration images. This facilitates the task of the physicians in the corresponding imaging procedures (for example, significantly reducing the above-mentioned risks).

The proposed solution makes it possible to train the neural network for different values of the increasing factor in a relatively simple and fast way. In fact, the required sample sets (or at least most of them) may be generated from the same incomplete sample sets by simply simulating the corresponding reduced-dose images for the required values of the increasing factor. This allows a flexible use of the neural network with these values of the increasing factor, and particularly for different operative conditions (such as patients, body-parts, lesions and so on).

Figure 4:
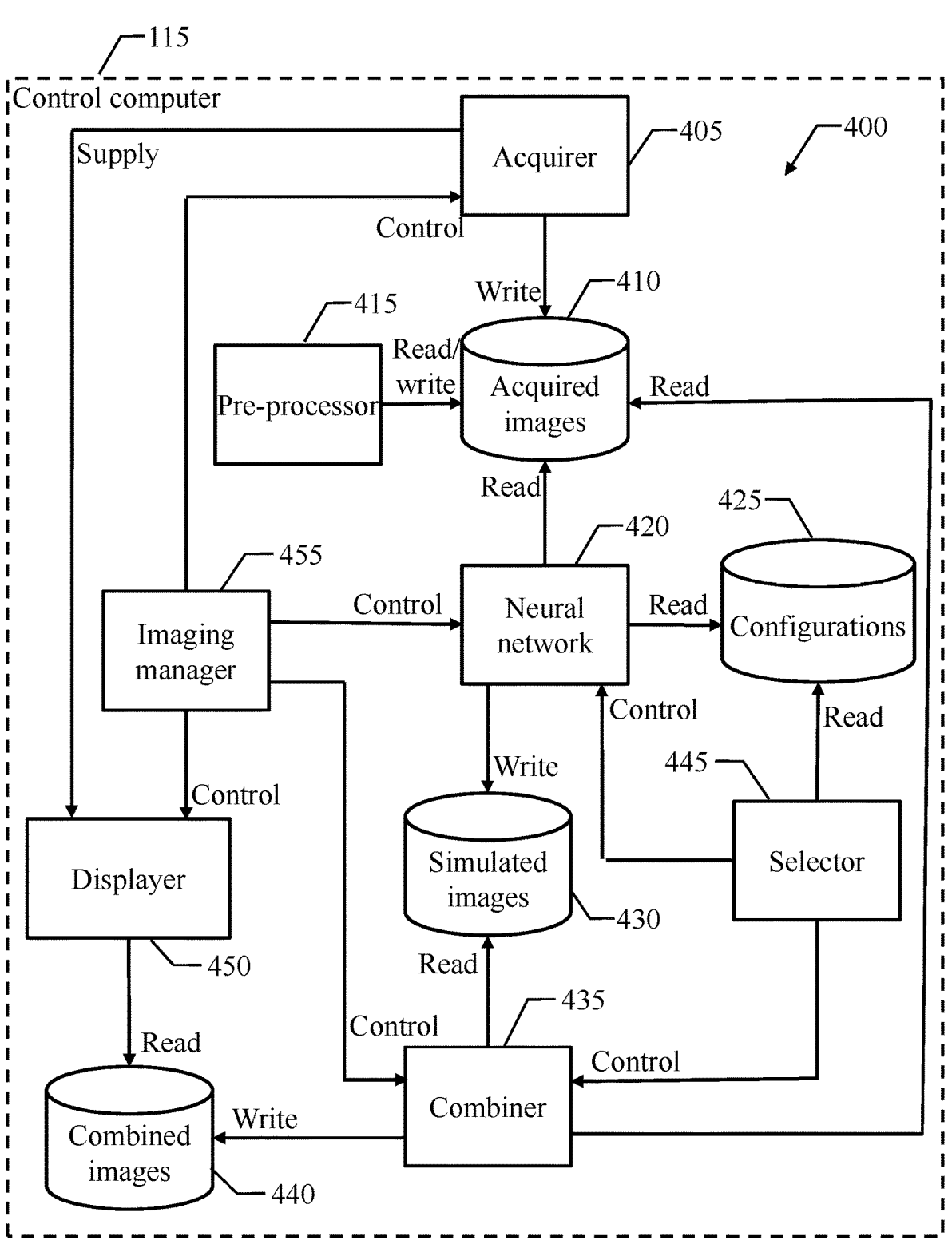
FIG. 4 shows the main software components that may be used to implement an imaging procedure according to an embodiment of the present disclosure.

With reference now to FIG. 4, the main software components are shown that may be used to implement an imaging procedure according to an embodiment of the present disclosure.

All the software components (programs and data) are denoted as a whole with the reference 400. The software components 400 are typically stored in the mass memory and loaded (at least in part) into the working memory of each control computer 115 when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

An acquirer 405 drives the components of the corresponding scanner dedicated to acquiring the (operative) acquired images, i.e., the (operative) baseline image and the (operative) administration images, of the body-part of the patient during each imaging procedure. The acquirer 405 writes an (operative) acquired images repository 410, which contains the acquired images being acquired during the imaging procedure that is in progress. The acquired images repository 410 has an entry for each acquired image. The entry stores a bitmap of the acquired image, which is defined by a matrix of cells (for example, with 512 rows and 512 columns) each containing a value of a voxel, i.e., a basic picture element representing a corresponding location (basic volume) of the body-part; each voxel value defines a brightness of the voxel (in gray-scale) as a function of a (signal)

intensity of a response signal relating to the corresponding location; for example, in case of an MRI scanner the response signal represents the response of the location to the magnetic field applied thereto, and in case of a CT scanner the response signal represents the attenuation of the X-ray radiation applied to the location.

A pre-preprocessor 415 pre-processes the acquired images (for example, by registering them). The pre-processor 415 reads/writes the acquired images repository 410. An (operative) machine learning model is used to simulate (or synthesize) the (operative) simulation images from the baseline image and the corresponding administration images by applying machine learning techniques. Basically, machine learning is used to perform a specific task (in this case, simulating the simulation images) without using explicit instructions but inferring how to do so automatically from examples (by exploiting a corresponding model that has been learnt from them). In the specific implementation at issue, there is applied a deep learning technique, which is a branch of machine learning based on neural networks. In this case, the machine learning model is an (operative) neural network 420. Basically, the neural network 420 is a data processing system that approximates operation of human brain. The neural network 420 comprises basic processing elements (neurons), which perform operations based on corresponding weights; the neurons are connected via uni-directional channels (synapses), which transfer data among them. The neurons are organized in layers performing different operations, always comprising an input layer and an output layer for receiving input data and for providing output data, respectively, of the neural network 420. In an embodiment of the present disclosure, the neural network 420 is a Convolutional Neural Network (CNN), i.e., a specific type of deep neural network (with one or more hidden layers arranged in succession between the input layer and the output layer along a processing direction of the neural network) wherein one or more of its hidden layers perform (cross) convolution operations. Particularly, the neural network 420 is an autoencoder (encoder-decoder) convolutional neural network, which comprises an encoder that compacts the data in a denser form (in a so-called latent space), which data so compacted are used to perform the desired operations, and a decoder that expands the result so obtained into a required more expanded form. More in detail, the input layer is configured to receive the baseline image and an administration image. The encoder comprises 3 groups each of 3 convolutional layers, which groups are followed by corresponding max-pooling layers, and the decoder comprises 3 groups each of 3 convolutional layers, which groups are followed by corresponding up-sampling layers. Each convolutional layer performs a convolution operation through a convolution matrix (filter or kernel) defined by corresponding weights, which convolution operation is performed in succession on limited portions of applied data (receptive field) by shifting the filter across the applied data by a selected number of cells (stride), with the possible addition of cells with zero content around a border of the applied data (padding) to allow applying the filter thereto as well. Batch normalization is then applied (fixing the mean and variance of the corresponding data), followed by an activation function (introducing a non-linearity factor). For example, each convolutional layer applies a filter of $3\times3$, with a padding of 1 and a stride of 1, with each neuron thereof applying a Rectified Linear Unit (ReLU) activation function. Each max-pooling layer is a pooling layer (down-sampling its applied data), which replaces the values of each limited portion of the applied data (window) with a single value, their maximum in this case, by shifting the window across the applied data by a selected number of cells (stride). For example, each max-pooling layer has a window of $2\times2$ with a stride of 1. Each up-sampling layer is un-pooling layer (reversing the pooling), which expands each value in a region around it (window), such as using max un-pooling technique (wherein the value is placed in the same position of the maximum used for the down-sampling and it is surrounded by zeros). For example, each up-sampling layer has a window of $2\times2$. Bypass connections are added between symmetric layers of the encoder and the decoder (to avoid resolution loss) and skip connections are added within each group of convolutional layers and from the input layer to the output layer (to focus on a difference between the administration image and the baseline image). The output layer then generates the simulation image by adding an obtained result (representing the contrast enhancement at the simulation-dose derived from the contrast enhancement at the administration-dose being denoised) to the baseline image.

The neural network 420 reads an (operative) configurations repository 425 defining one or more (operative) configurations of the neural network 420. The configurations repository 425 has an entry for each configuration of the neural network 420. The entry stores the configuration of the neural network 420 (defined by its weights) and the increasing factor provided by it when operating according to this configuration. The neural network 420 reads the acquired images repository 410 and it writes an (operative) simulation images repository 430. The simulation images repository 430 has an entry for each administration image in the acquired images repository 410. The entry stores a link to the corresponding administration image in the acquired images repository 410 and a bitmap of the corresponding simulation image, which is likewise defined by a matrix of cells (with the same size as the acquired images) each containing the voxel value of the corresponding location of the body-part. A combiner 435 combines the baseline image, each administration image and the corresponding simulation image into the corresponding combined image. The combiner 435 reads the acquired images repository 410 and the simulation images repository 430, and it writes an (operative) combined images repository 440. The combined images repository 440 has an entry for each combined image. The entry stores a bitmap of the combined image, which is likewise defined by a matrix of cells (with the same size as the simulation images) each containing the voxel value of the corresponding location of the body-part. A selector 445 exposes a user interface for selecting the value of the increasing factor to be applied by the neural network 420 and the value of the contribution of the simulation images to the combined images. The selector 445 reads the configurations repository 425 and it controls the neural network 420 and the combiner 435.

A displayer 450 drives the monitor of the control computer 115 for displaying the acquired images that are acquired and the combined images that are generated during each imaging procedure. The displayer 450 is supplied by the acquirer 405 and it reads the combined images repository 440. An imaging manager 455 manages each imaging procedure. For this purpose, the imaging manager 455 exposes a user interface for interacting with it. The imaging manager 455 controls the acquirer 405, the neural network 420, the combiner 435 and the displayer 450.

Figure 5:
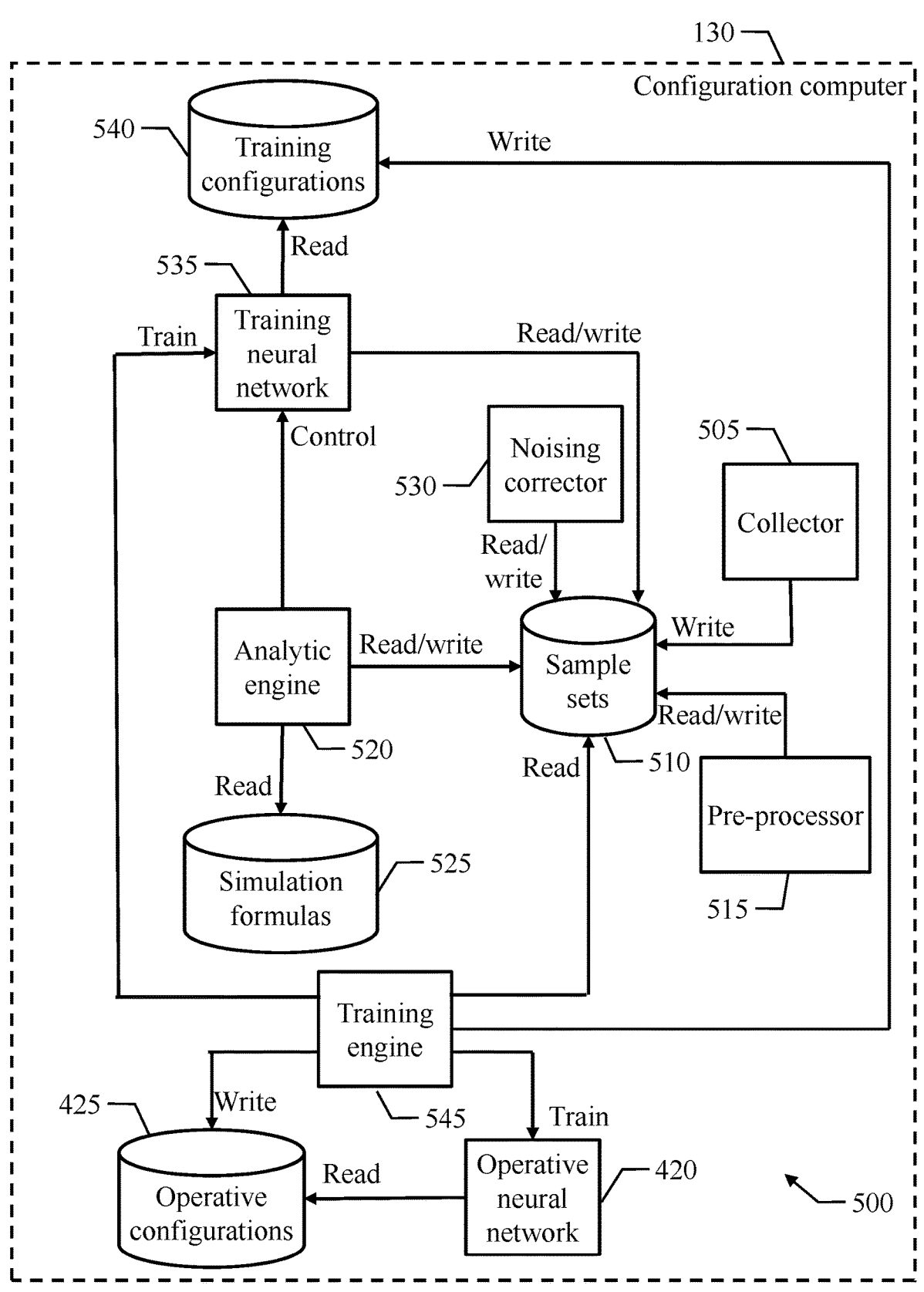
FIG. 5 shows the main software components that may be used to implement a training procedure according to an embodiment of the present disclosure.

With reference now to FIG. 5, the main software components are shown that may be used to implement a training procedure according to an embodiment of the present disclosure.

All the software components (programs and data) are denoted as a whole with the reference 500. The software components 500 are typically stored in the mass memory and loaded (at least in part) into the working memory of the configuration computer 130 when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

A collector 505 collects the (complete/incomplete) sample sets. For example, the incomplete sample sets, i.e., the corresponding (sample) zero-dose images and (sample) full-dose images, are received from the central servers of the health facilities (not shown in the figure) where they have been acquired during corresponding imaging procedures; the completed sample sets, i.e., further comprising the corresponding (sample) reduced-dose images, are instead obtained in laboratories with pre-clinical studies on animals (such as rats). In fact, the inventors have surprisingly found out that the operative neural network trained with sample sets derived (at least in part) from animals nevertheless provides good quality when applied to human beings. As a result, the complete sample sets may be provided in a relatively simple way. The collector 505 writes a sample sets repository 510 containing information relating to the sample sets. The sample sets repository 510 has an entry for each sample set. The entry stores corresponding bitmaps of the sample images of the sample set, i.e., its (acquired) zero-dose image, (acquired) full-dose image and (acquired/simulated) reduced-dose image; as above, the bitmap of each sample image is defined by a matrix of cells (for example, with 512 rows and 512 columns) each containing a voxel value of a corresponding location of the respective body-part. Moreover, if the sample set was initially incomplete, the entry stores one or more acquisition parameters relating to the acquisition of its zero-dose/full-dose images; particularly, the acquisition parameters comprise one or more extrinsic parameters relating to a setting of the scanner used to acquire the zero-dose/full-dose images and one or more intrinsic parameters relating to the corresponding body-part (for example, average values for main tissues of the body-part).

A pre-processor 515 pre-processes the zero-dose/full-dose images of each incomplete sample set (for example, by co-registering, de-noising and so on). The pre-processor 515 reads/writes the sample sets repository 510. An analytic engine 520 simulates (or synthesizes) the reduced-dose image from the zero-dose/full-dose images of each incomplete sample set. The analytic engine 520 exposes a user interface for interacting with it. The analytic engine 520 reads/writes the sample sets repository 510. The analytic engine 520 reads a simulation formulas repository 525, which stores one or more simulation formulas to be used for simulating the reduced-dose images.

For example, in case of an MRI scanner, when spin echo is selected as operation mode, the signal intensity defining each voxel value of the sample images (being given by a transverse component of a magnetization of the corresponding location of the body-part during a relaxation of the spins of the protons of the water molecules present therein for returning to their equilibrium condition after application of a magnetic pulse by the RF coil) is expressed by the following signal law:

$$M = M_0 \cdot e^{\frac{-TE}{T_2}} \left(1 - e^{\frac{-TE}{T_1}}\right),$$

wherein M is the signal intensity, $M_0$ is a parameter depending on density of the protons, size of the voxel, strength of the magnetic pulse and of the magnetic field, TE is the echo time (between application of the magnetic pulse and receipt of the echo signal), $T_2$ is the transverse relaxation time of the protons, TR is the repetition time (between successive sequences of magnetic pulses) and $T_1$ is the longitudinal relaxation time of the protons. In the zero-dose images (with no contrast agent), the parameters $T_1$ and $T_2$ may be replaced by corresponding diamagnetic values, generally denoted with $T_{10}$ and $T_{20}$, respectively, so that the signal intensity (differentiated as $M_{zero}$) becomes:

$$M_{zero} = M_0 \cdot e^{\frac{-TE}{T_{20}}} \cdot \left(1 - e^{\frac{-TE}{T_{10}}}\right).$$

Conversely, when the contrast agent is present in the location the parameters $T_1$ and $T_2$ depend on the corresponding diamagnetic values plus corresponding paramagnetic values given by the contrast agent, so that the signal intensity (differentiated as $M_{agent}$) becomes:

$$M_{agent} = M_0 \cdot e^{-TE\left(\frac{1}{T_{20}} + r_2 \cdot c\right)} \cdot \left(1 - e^{-TR\left(\frac{1}{T_{10}} + r_1 \cdot c\right)}\right),$$

wherein $r_2$ is the transverse relaxivity of the contrast agent, c is the local concentration of the contrast agent in the location and $r_1$ is the longitudinal relaxivity of the contrast agent. Linearizing this formula as a function of the local concentration of the contrast agent to the first-order approximation of its Taylor series, there is obtained (apart from a negligible error depending on the square of the local concentration of the contrast agent):

$$M_{agent} \cong M_0 \cdot e^{\frac{-TE}{T_{20}}} \cdot \left(1 - e^{\frac{-TE}{T_{10}}}\right) + F \cdot c = M_{zero} + F \cdot c,$$

$$\text{wherein } F = -\frac{M_0 \cdot e^{\frac{-TE}{T_{20}}} \cdot \left(1 - e^{\frac{-TR}{T_{10}}}\right)\left(r_2 \cdot TE \cdot \left(1 - e^{\frac{-TE}{T_{10}}}\right) + r_1 \cdot TR\right)}{1 - e^{\frac{-TR}{T_{10}}}}.$$

Therefore, in the full-dose image the signal intensity (differentiated as $M_{full}$) becomes:

$$M_{full} \cong M_{zero} + F \cdot c_{full},$$

wherein $c_{full}$ is the local concentration of the contrast agent when administered at the full-dose. Likewise, in the reduced-dose image the signal intensity (differentiated as $M_{reduced}$) becomes:

$$M_{reduced} \cong M_{zero} + F \cdot c_{reduced},$$

wherein $c_{reduced}$ is the local concentration of the contrast agent when administered at the reduced-dose. The local concentration of the contrast agent substantially scales linearly with the amount of contrast agent that is administered, so that:

$$c_{reduced} = d \cdot c_{full},$$

wherein d is the decreasing factor (for the corresponding increasing factor k=1/d). In view of the above, the simulation formula is:

$$M_{reduced} \cong M_{zero} + F \cdot c_{reduced} = M_{zero} + F \cdot d \cdot c_{full};$$

replacing the local concentration at the full-dose $c_{full}$ obtained from the definition of the corresponding intensity signal ($M_{full} \cong M_{zero} + F \cdot c_{full}$), the simulation formula becomes:

$$M_{reduced} \cong M_{zero} + F \cdot d \cdot \frac{M_{full} - M_{zero}}{F}$$

and then $$M_{reduced} \cong M_{zero} + d \cdot (M_{full} - M_{zero}).$$

The same simulation formula is obtained in other operation modes of the MRI scanner, such as gradient echo, MP-RAGE and so on.

Likewise, in case of a CT scanner the signal intensity defining each voxel value of the sample images (given by the X-ray radiation remaining after crossing the corresponding location because of its attenuation) is expressed by the following signal law:

$$I = I_0 \cdot e^{-\mu \cdot \rho \cdot x},$$

wherein I is the signal intensity, $I_0$ is the initial intensity of the X-ray radiation, $\mu$ is the linear attenuation coefficient, $\rho$ is the density and x is the thickness of the location. In the zero-dose images (with no contrast agent), the parameters $\mu$, $\rho$ and x are the ones relating to the corresponding material of the body-part, denoted with $\mu_M$, $\rho_M$ and $x_M$, respectively, so that the signal intensity (differentiated as $I_{zero}$) becomes:

$$I_{zero} = I_0 \cdot e^{-\mu_M \cdot \rho_M \cdot x_M}.$$

Conversely, when the contrast agent is present in the location an additional attenuation of the X-ray radiation is caused by it, so that the signal intensity (differentiated as $I_{agent}$) becomes:

$$I_{agent} = I_0 \cdot e^{-(\mu_M \cdot \rho_M \cdot x_M + \mu_A \cdot \rho_A \cdot x_A)},$$

wherein $\mu_A$ is the linear attenuation coefficient, $\rho_A$ is the density (given by the local concentration of the contrast agent) and $x_A$ is the thickness of the location. Linearizing this formula as a function of the local concentration of the contrast agent to the first order approximation of its Taylor series, there is obtained (apart from a negligible error depending on the square of the local concentration of the contrast agent):

$$I_{agent} =$$
$$I_0 \cdot e^{-\mu_M \cdot \mu_M \cdot x_M} \cdot e^{-\mu_A \cdot \mu_A \cdot x_A} = I_{zero} \cdot e^{-\mu_A \cdot \mu_A \cdot x_A} \cong I_{zero} \cdot (1 - \mu_A \cdot \rho_A \cdot x_A).$$

Therefore, in the full-dose image the signal intensity (differentiated as $I_{full}$) becomes:

$$I_{full} \cong I_{zero} \cdot (1 - \mu_A \cdot \rho_{full} \cdot x_A),$$

wherein $\rho_{full}$ is the density of the contrast agent when administered at the full-dose. Likewise, in the reduced-dose image the signal intensity (differentiated as $I_{reduced}$) becomes:

$$I_{reduced} \cong I_{zero} \cdot (1 - \mu_A \cdot \rho_{reduced} \cdot x_A),$$

wherein $\rho_{reduced}$ is the density of the contrast agent when administered at the reduced-dose. The density of the contrast agent substantially scales linearly with the amount of contrast agent that is administered, so that:

$$\rho_{reduced} = d \cdot \rho_{full},$$

(d being again the decreasing factor for the corresponding increasing factor k=1 d). In view of the above, the simulation formula is:

$$I_{reduced} \cong I_{zero} \cdot (1 - \mu_A \cdot \rho_{reduced} \cdot x_A) = I_{zero} \cdot (1 - \mu_A \cdot d \cdot \rho_{full} \cdot x_A);$$

replacing the density at the full-dose $\rho_{full}$ obtained from the definition of the corresponding intensity signal ($I_{full} \cong I_{zero} \cdot (1 - \mu_A \cdot \rho_{full} \cdot x_A)$), the simulation formula becomes:

$$I_{reduced} \cong I_{zero} \cdot \left(1 - d \cdot \left(\mu_A \cdot x_A \cdot \frac{I_{zero} - I_{full}}{\mu_A \cdot x_A \cdot I_{zero}}\right)\right)$$

and then as above $$I_{reduced} \cong I_{zero} + d \cdot (I_{full} - I_{zero}).$$

The proposed implementation (wherein the simulation formula is derived from the signal law being linearized with respect to the local concentration of the contrast agent) is computationally very simple, with the loss of accuracy of the reduced-dose images so obtained (due to the linearization of the signal law) that is acceptable for the purpose of training the (operative) neural network.

As an alternative, the signal law is approximated as a function of the local concentration (or density) to a higher order of its Taylor series (second, third and so on). In this case, the solution of the obtained equation for the local concentration of the contrast agent at the full-dose provides a corresponding number of values that need to be evaluated to discard any ones of them that are not physically meaningful. This increases the accuracy of the reduced-dose images that are simulated (with the higher the order of the approximation the higher the accuracy). As another alternative, the signal law is solved numerically for the local concentration of the contrast agent at the full-dose (again with an evaluation of the possible solutions to discard any ones of them that are not physically meaningful). This further increases the accuracy of the reduced-dose images that are simulated.

A noise corrector 530 corrects the noise of the reduced-dose images. In fact, the zero-dose image and the full-dose image of each incomplete sample set contain noise that is propagated to the corresponding reduced-dose image according to the simulation formula. However, the noise so obtained (simulated noise) has a statistical distribution that slightly differs from the one of the noise that would have been obtained by actually acquiring the reduced-dose image from the corresponding body-part of the patient to which the contrast agent at the reduced-dose has been administered (real noise). Particularly, the noise of the zero-dose image and the noise of the full-dose image may be considered to have a normal statistical distribution with zero mean and corresponding standard deviations that propagate to the reduced-dose image according to the rules of error (or uncertainty) propagation:

$$\sigma_{reduced} = \sqrt{d^2 \cdot \sigma_{full} + (1-d)^2 \cdot \sigma_{zero}},$$

wherein $\sigma_{reduced}$ is the standard deviation of the noise of the reduced-dose image, $\sigma_{full}$ is the standard deviation of the noise of the full-dose image and $\sigma_{zero}$ is the standard deviation of the noise of the zero-dose image (d being again the decreasing factor for the corresponding increasing factor k=1/d). Assuming that both the noise of the full-dose image and the noise of the zero-dose image have a same standard deviation $\sigma = \sigma_{full} = \sigma_{zero}$, in order to make the noise of the reduced-dose image having the same normal statistical distribution with zero mean and standard deviation $\sigma$, an artificial noise should be injected into the reduced-dose image having normal statistical distribution with zero mean and with a standard deviation $\sigma_{artificial}$ so that:

$$\sigma^2 = \sigma_{reduced}^2 + \sigma_{artifical}^2$$

(in case of injection of the artificial noise in additive form, with similar considerations that apply in case of injection of the artificial noise in multiplicative/convolutional form); the standard deviation of the artificial noise is then given by the following noising formula:

$$\sigma_{artificial} = \sqrt{\sigma^2 - \sigma_{reduced}^2} = \sqrt{\sigma^2 - (d^2 \cdot \sigma + (1-d)^2 \cdot \sigma)}$$
$$= \sigma \cdot \sqrt{2d(1-d)}.$$

However, the inventors have found out that better results are obtained by incrementing the (theoretical) value of the standard deviation $\sigma_{artificial}$ so obtained according to a correction factor being determined empirically (for example, equal to 1.5-2.5, preferably 1.7-2.3 and still more preferably 1.9-2.1, such as 2.0). The noise corrector 530 reads/writes the sample sets repository 510.

In addition or in alternative, the reduced-dose images of the incomplete sample sets are simulated (or synthesized) by an additional (training) machine learning model; for example, the machine learning model is a training neural network 535, and particularly an autoencoder convolutional neural network as above. The training neural network 535 reads a (training) configuration repository 540, which stores a (training) configuration of the training neural network 535 (i.e., its weights as above). The training neural network 535 as well reads/writes the sample sets repository 510.

A training engine 545 trains a copy of the operative neural network, denoted with the same reference 420, and the training neural network 535 (when available). The training engine 545 reads the sample sets repository 510. The training engine 545 writes a copy of the (operative) configurations repository being read by the operative neural network 420, denoted with the same reference 425, and it writes the configuration repository 540 of the training neural network 535.

Figure 6:
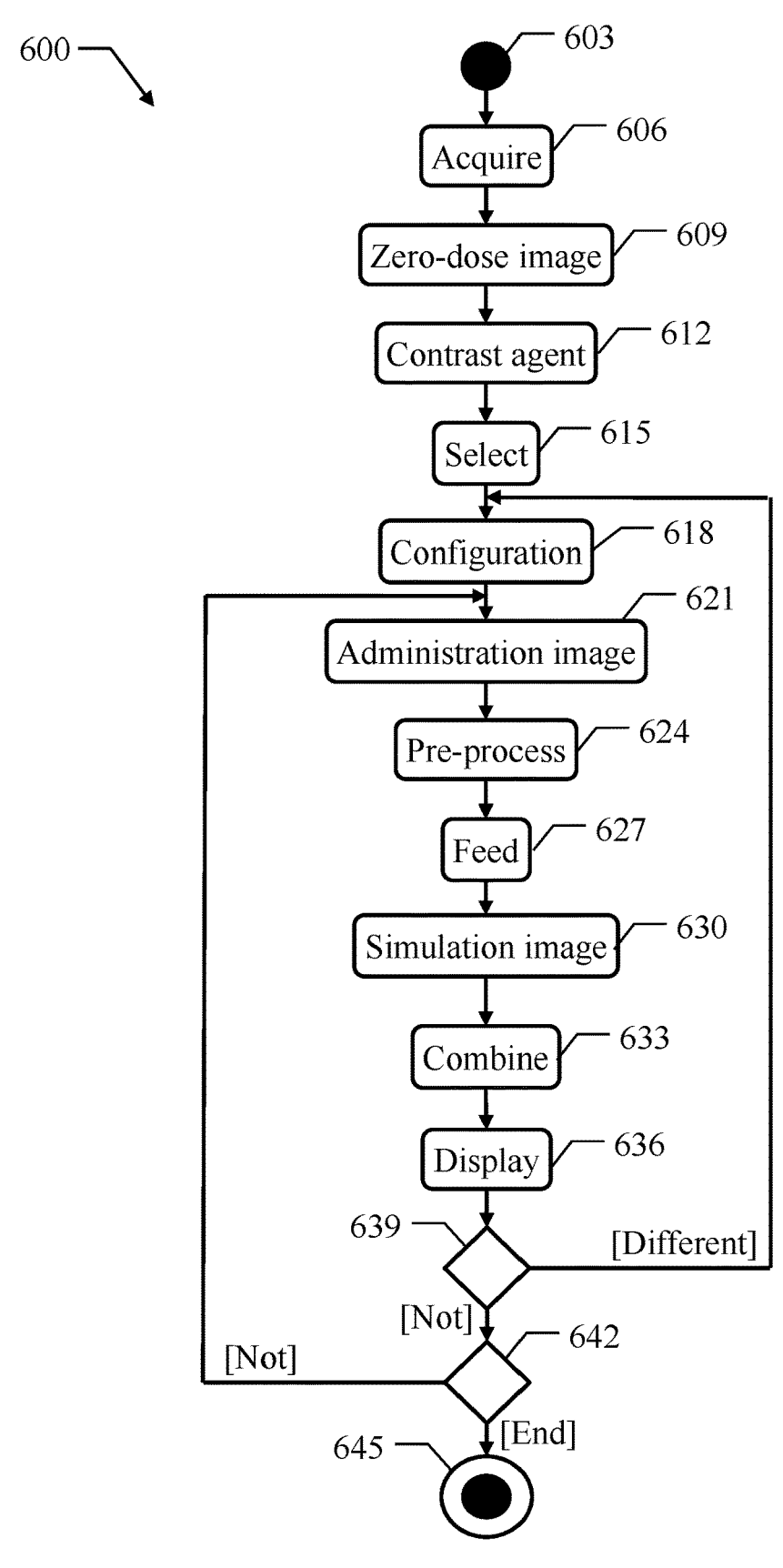
FIG. 6 shows an activity diagram describing the flow of activities relating to an imaging procedure according to an embodiment of the present disclosure.

With reference now to FIG. 6, an activity diagram is shown describing the flow of activities relating to an imaging procedure according to an embodiment of the present disclosure.

In this respect, each block may correspond to one or more executable instructions for implementing the specified logical function on the control computer. Particularly, the activity diagram represents an exemplary process that may be used for imaging a body-part of a patient during each imaging procedure with a method 600.

The process begins at the black start circle 603 as soon as a (new) imaging procedure is started (as indicated by a corresponding command entered by the physician or a healthcare operator, such as a radiologic technologist, via the user interface of the imaging manager after the patient has reached a proper position with reference to the scanner, such as inside the gantry in case of an MRI/CT scanner). In response thereto, the acquirer at block 606 starts acquiring the (operative) baseline images of the body-part, with the displayer that displays them in real-time on the monitor of the control computer. The baseline (zero-dose) images are acquired before administering the contrast agent to the patient, so that the body-part contains no contrast agent, or at least no significant amount thereof (since the patient has never been administered any contrast agent or a relatively long time has elapsed from a previous administration of any contrast agent to the patient ensuring that it has been substantially cleared). Once the physician has selected one of the zero-dose images (by means of a corresponding command entered via the user interface of the imaging manager directly or by the healthcare operator), the acquirer at block 609 saves this zero-dose image into the (operative) acquired images repository (initially empty).

The displayer at block 612 then displays a message on the monitor of the control computer asking for the administration of the contrast agent (for example, based on gadolinium in MRI applications, based on iodine in CT applications, and so on) to the patient. The contrast agent is administered at the administration-dose. Normally, the administration-dose is equal to the full-dose of the contrast agent. The full-dose has a standard value in clinical practice, which is required by heath care authorities (i.e., institutions having jurisdiction over application of health care) or it is recommended by recognized institutions or consistent scientific publications. For example, in MRI applications the full-dose of the contrast agent is 0.1 mmol of gadolinium per kg of weight of the patients. In CT applications, the full-dose of the contrast agent based on iomeprol with a formulation of 155-400 mg/mL, for example, commercially available under the name of Iomeron by Bracco Imaging S.p.A. (trademarks thereof), is 20-200 mL for imaging heads and 100-200 mL for imaging other body-part types; alternatively, the full of dose of contrast agent based on iopamidol, for example, commercially available under the name of Isovue by Bracco Imaging S.p.A. (trademarks thereof), is 100-230 mL for a formulation of 250 mg/ml or 100-200 mL for a formulation of 300 mg/mL (with a total dose of iodine that should not exceed 60 g) in adults and 1.2-3.6 mL per kg of weight of the patients for the formulation of 250 mg/mL or 1.0-3.0 mL per kg of weight of the patients for the formulation of 300 mg/mL (with a total dose of iodine that should not exceed 30 g) in children. However, the administration-dose may also be lower than the full-dose in specific situations (for example, when the administration of the full-dose may be dangerous).

In response thereto, the healthcare operator administers the contrast agent to the patient. Particularly, the contrast agent is adapted to reaching a specific (biological) target, such as a tumor to be inspected/resected/treated, and to remaining substantially immobilized therein. This result may be achieved by using either a non-targeted contrast agent (adapted to accumulating in the target without any specific interaction therewith, such as by passive accumulation) or a targeted contrast agent (adapted to attaching to the target by means of a specific interaction therewith, such as achieved by incorporating a target-specific ligand into the formulation of the contrast agent, for example, based on chemical binding properties and/or physical structures capable of interacting with different tissues, vascular properties, metabolic characteristics and so on). The contrast agent may be administered to the patient intravenously as a bolus (for example, with a syringe). Consequently, the contrast agent circulates within the vascular system of the patient until reaching the target and binding thereto; the remaining (unbound) contrast agent is instead cleared from the blood pool of the patient. After a waiting time allowing the contrast agent to accumulate in the (possible) target and to wash-out from the rest of the patient (for example, some minutes), the imaging procedure may actually start (for example, as indicated by a corresponding command entered by the physician or the healthcare operator via the user interface of the imaging manager). Meanwhile, the acquirer continues acquiring the (operative) administration images of the body-part, with the displayer that displays them in real-time on the monitor of the control computer.

At any time, the physician may select at block 615 a desired (selected) value of the increasing factor (via the user interface of the selector directly or by the healthcare operator); particularly, in a discrete mode the selected value of the increasing factor may be chosen among the ones corresponding to the operative configurations of the (operative) neural network in the corresponding repository. At the same time, the physician may select a desired (selected) value of the (relative) contribution of the (operative) simulation images to the (operative) combined images with respect to the one of the zero-dose/administration images (via the user interface of the selector directly or by the healthcare operator); for example, the contribution of the simulation images is set by default to be the same as the one of the zero-dose/ administration images, and it may be increased (in either a continuous or discrete way) up to a maximum value thereof (such as 5-10). In response thereto, the displayer stops displaying the administration images on the monitor of the control computer. The neural network at block 618 configures according to the configuration for the selected value of the increasing factor (retrieved from the corresponding repository). The acquirer at block 621 saves a (new) administration image being just acquired into the (operative) acquired images repository. The pre-processor at block 624 pre-processes the administration image; particularly, the pre-processor co-registers the administration image with the zero-dose image (in the acquired images repository) to bring them into spatial correspondence, for example, by applying a rigid transformation to the administration image. The imaging manager at block 627 feeds the zero-dose image and the (pre-processed) administration image to the neural network. Moving to block 630, the neural network outputs the corresponding simulation image, which is saved into the corresponding repository.

The combiner at block 633 combines the zero-dose image, the administration image and the simulation image (retrieved from the corresponding repositories) into their combined image, which is saved into the corresponding repository. For example, for this purpose the combiner applies a modified version of an exposure blending algorithm (being adapted to this different application), which implements a particular type of HDR technique maintaining unaltered the dynamic range. Particularly, the combiner calculates an (operative) zero-dose mask, an (operative) administration mask and an (operative) simulation mask from the zero-dose image, the administration image and the simulation image, respectively. Each zero-dose/administration/simulation mask comprises a matrix of cells (with the same size as the zero-dose/administration/simulation images) each containing a mask value for the corresponding location. In case of the administration mask and of the simulation mask, each mask value is set to the corresponding voxel value of the administration image and simulation image, respectively; in case of the zero-dose mask, instead, each mask value is set to the corresponding voxel value of the zero-dose image being complemented to its maximum possible value. Each voxel value of the combined image is then calculated by applying the following blending formula:

$$V_c = \frac{w_0 \cdot \overline{M_0} \cdot V_0}{w_0 \cdot \overline{M_0} + w_l \cdot M_l + w_h \cdot M_h} +$$
$$\frac{w_l \cdot M_l \cdot V_l}{w_0 \cdot \overline{M_0} + w_l \cdot M_l + w_h \cdot M_h} + \frac{w_h \cdot M_h \cdot V_h}{w_0 \cdot \overline{M_0} + w_l \cdot M_l + w_h \cdot M_h},$$

wherein $V_c$, $V_0$, $V_l$ and $V_h$ are the voxel values of the combined image, of the zero-dose image, of the administration image and of the simulation image, respectively, $\overline{M_0}$, $M_l$ and $M_h$ are the corresponding mask values of the zero-dose mask, of the administration mask and of the simulation mask, respectively, and $w_0$, $w_l$ and $w_h$ are a (zero-dose) weight, an (administration) weight and a (simulation) weight of the zero-dose image, of the administration image and of the simulation image, respectively. The mask values $M_l, M_h$ of the administration/simulation masks (gray-scale values) make the voxel values $V_l, V_h$ of the administration/simulation images mainly contribute to the voxel value $V_c$ of the combined image when they are high (bright voxel), whereas the mask value $\overline{M_0}$ of the zero-dose mask (inverted gray-scale value) makes the voxel value $V_0$ of the zero-dose image mainly contribute to the voxel value $V_c$ of the combined image when it is low (dark voxel). The zero-dose weight $w_0$, the administration weight $w_l$ and the simulation weight $w_h$ define the (relative) contribution of the zero-dose image, of the administration image and of the simulation image, respectively, to the combined image (increasing with their values). The term $w_0 \cdot \overline{M_0} + w_l \cdot M_l + w_h \cdot M_h$ is a normalization value that maintains the dynamic range of the combined image the same as the one of the zero-dose/administration/simulation images.

The displayer at block 636 displays the combined image (retrieved from the corresponding repository) on the monitor of the control computer; the combined image is then displayed substantially in real-time with the acquisition of the corresponding administration image (apart a short delay due to the time required by the neural network and the combiner to generate it). The selector at block 639 verifies whether a different value of the increasing factor and/or of the contribution of the simulation images to the combined images has been selected. If so, the process returns to block 618 for updating the configuration of the operative neural network according to the (new) selected value of the increasing factor and/or the simulation weight $w_h$ according to the (new) selected contribution of the simulation images, and then repeating the same operations continually. Conversely, the imaging manager at block 642 verifies a status of the imaging procedure. If the imaging procedure is still in progress, the flow of activity returns to block 621 for repeating the same operations continually. Conversely, if the imaging procedure has ended (as indicated by a corresponding command entered by the physician or the healthcare operator via the user interface of the imaging manager), the process ends to the concentric white/black stop circles 645.

Figure 7A:
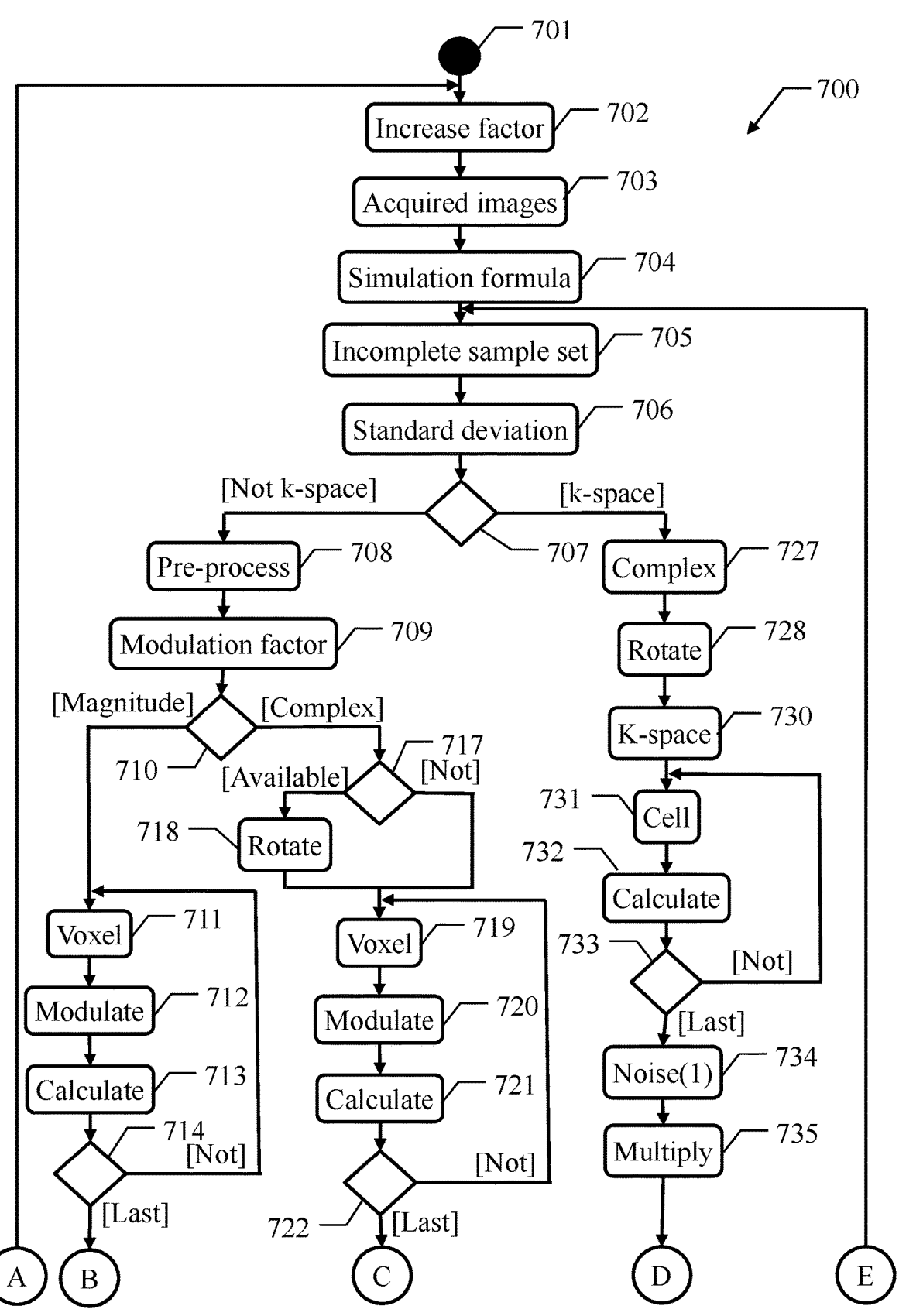
FIG. 7A-FIG. 7C show an activity diagram describing the flow of activities relating to a training procedure according to an embodiment of the present disclosure.
Figure 7B:
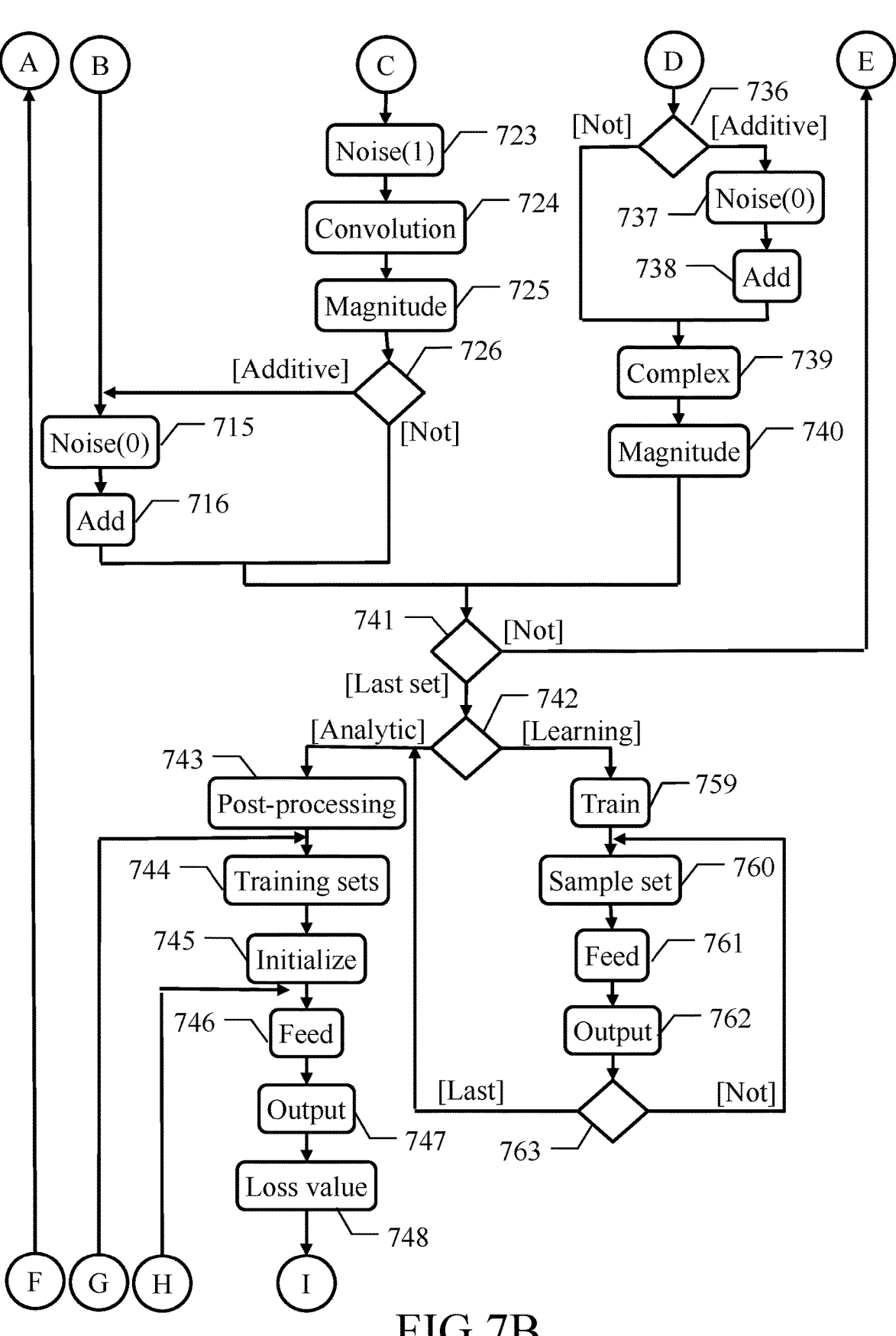
Figure 7C:
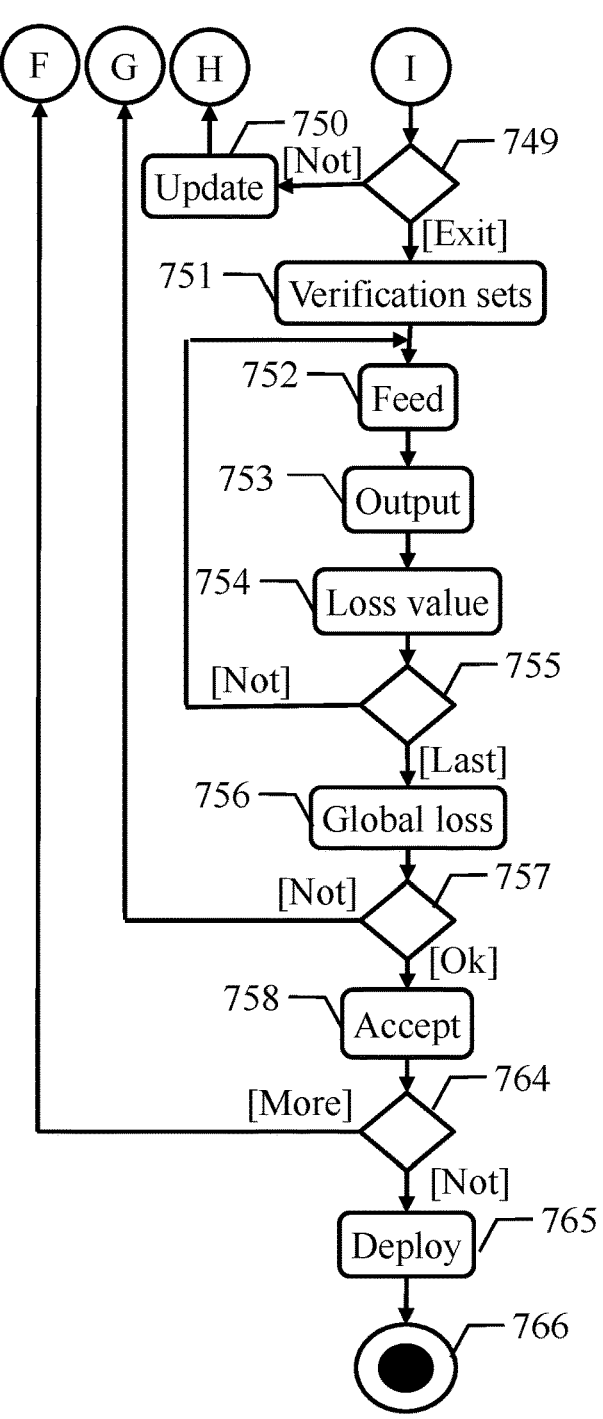

With reference now to FIG. 7A-FIG. 7C, an activity diagram is shown describing the flow of activities relating to a training procedure according to an embodiment of the present disclosure.

In this respect, each block may correspond to one or more executable instructions for implementing the specified logical function on the configuration computer. Particularly, the activity diagram represents an exemplary process that may be used for training the operative neural network with a method 700.

The process begins at the black start circle 701 whenever the operative neural network needs to be trained. Particularly, this happens before a first delivery of the operative neural network; moreover, this may also happen periodically, in response to any significant change of operative conditions of the imaging systems (for example, delivery of new models of the corresponding scanners, variation of patient population being imaged and so on), in case of a maintenance of the operative neural network or in case of release of a new version of the operative neural network, in order to maintain the required performance of the imaging systems over time. In response thereto, the analytic engine at block 702 prompts an operator to enter (via its user interface) an indication of a desired increasing factor for which the operative neural network has to be trained, also defining the decreasing factor of the (sample) reduced-dose images to be simulated for this purpose as its inverse.

The collector at block 703 collects a plurality of image sequences of corresponding imaging procedures being performed on body-parts of different subjects (for example, in one or more health facilities for the incomplete sample sets and in laboratories for the complete sample sets) together with the corresponding acquisition parameters for the incomplete sample sets; the body-parts are of the same type for which the operative neural network is intended to be used. Each image sequence for the incomplete sample sets comprises a sequence of images that have been acquired at the beginning without the contrast agent and then with the contrast agent at the full-dose (for example, being actually used during corresponding imaging procedures to provide the visual representations of the corresponding body-part); each image sequence for the complete sample sets further comprises a sequence of images that have been acquired with the contrast agent at the reduced-dose (for example, in pre-clinical studies). Some image sequences may also comprise corresponding raw-data (being used to generate the corresponding sample images). For example, in case of an MRI scanner it acquires the raw data as (k-space) images in k-space form. Each k-space image is defined by a matrix of cells with a horizontal axes corresponding to a spatial frequency, or wavenumber k (cycles per unit distance), and a vertical axes corresponding to a phase of the response signals being detected; each cell contains a complex number defining different amplitude components of the corresponding response signal. The k-space image is converted into a corresponding (complex) image in complex form by applying an inverse Fourier transform thereto. The complex image is defined by a matrix of cells for the corresponding voxels; each cell contains a complex number representing the response signal being received from the corresponding location. In the end, the complex image is converted into a corresponding (sample) acquired image in magnitude form, by setting each voxel value thereof to the modulus of the corresponding complex number in the complex image.

In this phase, the collector may filter the image sequences, for example, to discard the ones having poor quality. In any case, for each image sequence the collector selects one of the images being acquired with no contrast agent as (sample) zero-dose image, one or more images being acquired with the contrast agent, up to all of them, as (sample) full-dose images and the corresponding reduce-dose images (when available); the collector then creates a new entry in the sample sets repository for each full-dose image, and it adds the zero-dose image, the full-dose image, the corresponding reduced-dose image (if available) and a link to the corresponding acquisition parameters (when the reduced-dose image is not available). The sample sets repository may then store a mix of incomplete sample sets and complete sample sets; for example, the complete sample sets are 1-20%, preferably 5-15% and still more preferably 6-12%, such as 10% of a total number of the (incomplete/complete) sample sets. This further increases the quality of the training of the operative neural network with a limited additional effort (especially when the complete sample sets are obtained from pre-clinical studies).

The analytic engine at block 704 retrieves the simulation formula (from the corresponding repository) to be used to simulate the reduced-dose images of the incomplete sample sets (for example, selected manually by the operator via its user interface, defined by default or the only one available). A loop is then entered at block 705, wherein the analytic engine takes a (current) incomplete sample set of the sample set repository into account (starting from a first one in any arbitrary order). The noise corrector at block 706 calculates the noise of the zero-dose image (as a difference between it as acquired and as denoised) and then its (zero-dose) standard deviation; likewise, the noise corrector calculates the noise of the full-dose image (as a difference between it as acquired and as denoised) and then its (full-dose) standard deviation. In both cases, the acquired (zero-dose and full-dose) images may be denoised with an autoencoder (convolutional neural network). For this purpose, the autoencoder has been trained in an unsupervised way with a plurality of images (such as all the acquired images); particularly, the autoencoder has been trained to optimize its capability of encoding each image, ignoring insignificant data thereon (being due to noise) and then decoding the obtained result, so as to reconstruct the same image with reduced noise. The noise corrector determines a reference standard deviation, for example, equal to an average of the zero-dose standard deviation and the full-dose standard deviation. The noise corrector calculates the standard deviation of the artificial noise by applying the noising formula to the reference standard deviation and then increasing the obtained result by the correction factor. The flow of activity branches at block 707 according to a configuration of the analytic engine (for example, selected manually by the operator via its user interface, defined by default or the only one available). Particularly, if the analytic engine is not configured to operate in the k-space blocks 708-726 are executed, whereas otherwise blocks 727-740 are executed; in both cases, the flow of activity joints again at block 741.

With reference now to block 708 (not k-space), the pre-processor pre-processes the acquired (zero-dose/full-dose) images of the incomplete sample set. Particularly, the pre-processor co-registers the full-dose image with the zero-dose image to bring them into spatial correspondence (for example, by applying a rigid transformation to the full-dose image). In addition or in alternative, the pre-processor de-noises the acquired images to reduce their noise (as above). The analytic engine at block 709 calculates a modulation factor for modulating the decreasing factor to be used to apply the simulation formula. In fact, the simulation formula may introduce an approximation, with the higher the local concentration of the contrast agent the higher the approximation. Particularly, starting from a simulation value of the signal intensity (given by the simulation formula) being substantially equal to a real value of the signal intensity (which would have been obtained by actually acquiring the reduced-dose image from the body-part of the patient to which the contrast agent has been administered at the (sample) reduced-dose) when no contrast agent is present, the simulation value becomes lower and lower than the real value as the local concentration of the contrast agent increases. In order to compensate this loss of the simulation value with respect to the real value, it is possible to increment the value of the decreasing factor being used in the simulation formula (so as to limit the reduction of the simulation value with respect to the corresponding administration value). More specifically, by solving an equation setting a ratio between the signal law and its approximation equal to one for the decreasing factor, it is obtained that the value of the decreasing factor should be incremented linearly as a function of the local concentration of the contrast agent according to a proportionality factor (modulation factor) depending on the acquisition parameters; the modulation factor is given by a (correction) formula determined analytically as a function of the acquisition parameters or by values corresponding to the acquisition parameters determined empirically. Therefore, the analytic engine retrieves the acquisition parameters of the incomplete sample set from the sample sets repository, and then it calculates the modulation factor by applying the correction formula to the acquisition parameters or by retrieving its value corresponding to the acquisition parameters from a pre-defined table.

The flow of activity further branches at block 710 according to the configuration of the analytic engine. Particularly, if the analytic engine is configured to operate on images in magnitude form, a loop is entered at block 711 wherein the analytic engine takes a (current) voxel of the full-dose image into account (starting from a first one in any arbitrary order). The analytic engine at block 712 modulates the decreasing factor to be used to apply the simulation formula for the voxel. For this purpose, the analytic engine calculates the contrast enhancement of the voxel as a difference between the voxel value of the full-dose image and the voxel value of the zero-dose image, and then the modulated value of the decreasing factor by multiplying it by the product between the modulation factor and the contrast enhancement. The analytic engine at block 713 calculates the voxel value of the reduced-dose image by applying the simulation formula with the (modulated) decreasing factor to the voxel value of the zero-dose image and the voxel value of the full-dose image; therefore, in the example at issue the analytic engine subtracts the voxel value of the zero-dose image from the voxel value of the full-dose image, multiplies this difference by the decreasing factor and adds the obtained result to the voxel value of the zero-dose image. The analytic engine then adds the voxel value so obtained to the reduced-dose image under construction in the sample sets repository. The analytic engine at block 714 verifies whether a last voxel has been processed. If not, the flow of activity returns to block 711 to repeat the same operations on a next voxel. Conversely (once all the voxels have been processed) the corresponding loop is exited by descending into block 715.

At this point, the noise corrector injects the artificial noise into the reduced-dose image so obtained in additive form. For this purpose, the noise corrector generates the artificial noise as a (noise) matrix of cells having the same size as the reduced-dose image; the noise matrix contains random values having normal statistical distribution with zero mean and standard deviation equal to the one of the artificial noise. The noise corrector at block 716 adds the noise matrix to the reduced-dose image voxel-by-voxel in the sample sets repository. The process then continues to block 741.

With reference back to block 710, if the analytic engine is configured to operate on images in complex form the flow of activity branches at block 717 according to their availability. If the zero-dose image and the full-dose image are already available in complex form, the analytic engine at block 718 performs a phase correction by rotating a vector representing the complex number of each cell thereof so as to cancel its argument (maintaining the same modulus). This operation allows obtaining the same result of the application of the simulation formula even when operating on the zero-dose image and full-dose image in complex form (since all the operations applied to the corresponding complex numbers without imaginary part are equivalent to apply them to the corresponding modulus). The process then continues to block 719. The same point is also reached directly from block 717 if the zero-dose image and the full-dose image are available in magnitude form; in this case, the zero-dose image and the full-dose image are considered directly as in complex form, with each voxel value thereof (real number) being a complex number with imaginary part equal to zero.

Similar operations as above are now performed for generating the reduced-dose image from the zero dose-image and the full-dose image working on them in complex form.

Particularly, a loop is entered wherein the analytic engine takes a (current) voxel of the full-dose image into account (starting from a first one in any arbitrary order). The analytic engine at block 720 modulates the decreasing factor by calculating the contrast enhancement of the voxel (as the different between the modulus of the voxel value of the full-dose image and the modulus of the voxel value of the zero-dose image) and then the modulated value of the decreasing factor by multiplying it by the product between the modulation factor and the contrast enhancement. The analytic engine at block 721 calculates the voxel value of the reduced-dose image by applying the simulation formula with the (modulated) decreasing factor to the voxel value of the zero-dose image and the voxel value of the full-dose image; the analytic engine then adds the voxel value so obtained to the reduced-dose image under construction in the sample sets repository. The analytic engine at block 722 verifies whether a last voxel has been processed. If not, the flow of activity returns to block 719 to repeat the same operations on a next voxel. Conversely (once all the voxels have been processed) the corresponding loop is exited by descending into block 723.

At this point, the noise corrector injects the artificial noise into the reduced-dose image so obtained in convolutional form. For this purpose, the noise corrector generates the artificial noise as a (noise) matrix of cells having the same size as the reduced-dose image; the noise matrix contains random complex values having normal statistical distribution with unitary mean and standard deviation equal to the one of the artificial noise. The noise corrector at block 724 then performs a convolution operation on the reduced-dose image in the sample sets repository through the noise matrix (for example, by shifting the noise matrix across the reduced-dose image by a single stride in a circular way, wrapping around the reduced-dose image in every direction). The analytic engine at block 725 converts the reduced-dose image so obtained into magnitude form; for this purpose, the analytic engine replaces each voxel value of the reduced-dose image (now generally a complex number) with its modulus. The flow of activity further branches at block 726 according to the configuration of the analytic engine. Particularly, if the analytic engine is configured to inject the artificial noise into the reduced-dose image in additive form as well, the process continues to block 715 for performing the same operations described above (then descending into block 741). Conversely, the process descends into block 741 directly.

With reference instead to block 727 (k-space), the analytic engine takes the zero-dose image and the full-dose image in complex form into account (directly if available or by converting them from k-space form by applying the inverse Fourier transform thereto). As above, the analytic engine at block 728 performs a phase correction by rotating the vector representing the complex number of each cell of the zero-dose image and the full-dose image in complex form so as to cancel its argument (maintaining the same modulus). The analytic engine at block 730 converts the zero-dose image and the full-dose image from complex form into k-space form by applying a Fourier transform thereto.

The reduced-dose image is now generated from the zero dose-image and the full-dose image working on them in k-space form. Particularly, a loop is entered at block 731 wherein the analytic engine takes a (current) cell of the full-dose image into account (starting from a first one in any arbitrary order). The analytic engine at block 732 calculates the cell value of the reduced-dose image by applying the simulation formula with the (original) decreasing factor to the cell value of the zero-dose image and the cell value of the full-dose image; the analytic engine then adds the cell value so obtained to the reduced-dose image under construction in the sample sets repository. The analytic engine at block 733 verifies whether a last cell has been processed. If not, the flow of activity returns to block 731 to repeat the same operations on a next cell. Conversely (once all the cells have been processed) the corresponding loop is exited by descending into block 734.

At this point, the noise corrector injects the artificial noise into the reduced-dose image so obtained in multiplicative form. For this purpose, the noise corrector generates the artificial noise as a (noise) matrix of cells having the same size as the reduced-dose image; the noise matrix contains complex random values having normal statistical distribution with unitary mean and standard deviation equal to the one of the artificial noise. The noise corrector at block 735 multiplies the reduced-dose image by the noise matrix cell-by-cell in the sample sets repository. The flow of activity further branches at block 736 according to the configuration of the analytic engine. Particularly, if the analytic engine is configured to inject the artificial noise into the reduced-dose image in additive form as well, the process continues to block 737, wherein the noise corrector generates the artificial noise as a (further) noise matrix of cells (having the same size as the reduced-dose image) now containing random complex values having normal statistical distribution with null mean and standard deviation equal to the one of the artificial noise. The noise corrector at block 738 adds the noise matrix to the reduced-dose image cell-by-cell in the sample sets repository. The process then continues to block 739; the same point is also reached directly from block 736 if the analytic engine is not configured to inject the artificial noise into the reduced-dose image in additive form. At this point, the analytic engine converts the reduced-dose image from k-space form into complex form by applying the inverse Fourier transform thereto. The analytic engine at block 740 converts the reduced-dose image from complex form into magnitude form by replacing each voxel value of the reduced-dose image with its modulus. The process then descends into block 741.

The above-described operations complete the incomplete sample set. With reference now to block 741, the analytic engine verifies whether a last incomplete sample set has been processed. If not, the flow of activity returns to block 705 to repeat the same operations on a next incomplete sample set. Conversely (once all the incomplete sample sets have been processed) the corresponding loop is exited by descending into block 742.

At this point, the flow of activity branches according to an operative mode of the configuration computer. If the sample sets are to be used for training the operative neural network since no training neural network is available, the training engine directly performs this operation, in order to find optimized values of the weights of the operative neural network that optimize its performance. This implementation is particularly simple and fast; at the same time, the accuracy of the reduced-dose images being simulated is sufficient for the purpose of training the operative neural network with acceptable performance. Particularly, the analytic engine at block 743 may post-process the sample (zero-dose/reduced-dose/full-dose) images of each sample set (being completed as above or provided already completed). For example, the analytic engine normalizes the sample images by scaling their voxel values to a (common) pre-defined range. Moreover, the analytic engine performs a data augmentation procedure by generating (new) sample sets from each (original) sample set, so as to reduce overfitting in the training of the operative neural network. For example, the new sample sets are generated by rotating the sample images of the original sample set, such as incrementally by 1-5° from 0° to 90°, and/or by flipping them horizontally/vertically. Moreover, if not already done for the reduced-dose image of the original sample set being incomplete, the artificial noise is added as above to the reduced-dose images of the original/ new sample sets. In any case, the training engine at block 744 selects a plurality of training sets by sampling the sample sets in the corresponding repository to a percentage thereof (for example, 50% selected randomly). The training engine at block 745 initializes the weights of the operative neural network randomly. A loop is then entered at block 746, wherein the training engine feeds the zero-dose image and the reduced-dose image of each training set to the operative neural network. In response thereto, the operative neural network at block 747 outputs a corresponding output image, which should be equal to the full-dose image (ground truth) of the training set. The training engine at block 748 calculates a loss value based on a difference between the output image and the full-dose image; for example, the loss value is given by the Mean Absolute Error (MAE) calculated as the average of the absolute differences between the corresponding voxel values of the output image and of the full-dose image. The training engine at block 749 verifies whether the loss value is not acceptable and it is still improving significantly. This operation may be performed either in an iterative mode (after processing each training set for its loss value) or in a batch mode (after processing all the training sets for a cumulative value of their loss values, such as an average thereof). If so, the trainer at block 750 updates the weights of the operative neural network in an attempt to improve its performance. For example, the Stochastic Gradient Descent (SGD) algorithm, such as based on the ADAM method, is applied (wherein a direction and an amount of the change is determined by a gradient of a loss function, giving the loss value as a function of the weights being approximated with a backpropagation algorithm, according to a pre-defined learning rate). The process then returns to block 746 to repeat the same operations. With reference again to block 749, if the loss value has become acceptable or the change of the weights does not provide any significant improvement (meaning that a minimum, at least local, or a flat region of the loss function has been found) the loop is exited by descending to block 751. The above-described loop is repeated a number of times (epochs), for example, 100-300, by adding a random noise to the weights and/or starting from different initializations of the operative neural network to find different (and possibly better) local minimums and to discriminate the flat regions of the loss function.

Once a configuration of the operative neural network has been found providing an optimal minimum of the loss function, the training engine performs a verification of the performance of the operative neural network so obtained. For this purpose, the training engine selects a plurality of verification sets from the sample sets in the corresponding repository (for example, the ones different from the training sets). A loop is then entered at block 752, wherein the training engine feeds the zero-dose image and the reduced-dose image of a (current) verification set (starting from a first one in any arbitrary order) to the operative neural network. In response thereto, the operative neural network at block 753 outputs a corresponding output image, which should be equal to the full-dose image of the verification set. The training engine at block 754 calculates the loss value as above based on the difference between the output image and the full-dose image. The training engine at block 755 verifies whether a last verification set has been processed. If not, the flow of activity returns to block 752 to repeat the same operations on a next verification set. Conversely (once all the verification sets have been processed) the loop is exited by descending into block 756. At this point, the training engine determines a global loss of the above-mentioned verification (for example, equal to an average of the loss values of all the verification sets). The flow of activity branches at block 757 according to the global loss. If the global loss is (possibly strictly) higher than an acceptable value, this means that the capability of generalization of the operative neural network (from its configuration learned from the training sets to the verification sets) is too poor; in this case, the process returns to block 744 to repeat the same operations with different training sets and/or training parameters (such as learning rate, epochs and so on). Conversely, if the global loss is (possibly strictly) lower than the acceptable value, this means that the capability of generalization of the operative neural network is satisfactory; in this case, the training engine at block 758 accepts the configuration of the operative neural network so obtained, and saves it into the corresponding repository in association with its value of the increasing factor.

Referring back to block 742, if the training neural network is available to simulate the reduced-dose images (to be used to train the operative neural network), the training engine at block 759 trains it by using the sample sets. For example, the same operations described above may be performed, with the difference that the training neural network is now optimized to generate the reduced-dose images from the corresponding zero-dose images and full-dose images; in this case, it is also possible to use a more complex loss function to improve performance of the training neural network, for example, with an approach making use of Generative Adversarial Networks (GANs). The configuration of the training neural network so obtained is then saved into the corresponding repository; at the same time, the reduced-dose images that have been simulated analytically are deleted from the sample sets repository so as to restore the corresponding incomplete sample sets. A loop is then entered at block 760 for simulating a refined version of the reduced-dose images of the incomplete sample sets (retrieved from the sample sets repository). For this purpose, the training neural network takes a (current) incomplete sample set into account (starting from a first one in any arbitrary order). The analytic engine at block 761 feeds the zero-dose image and the full-dose image of the incomplete sample set to the training neural network. Moving to block 762, the training neural network outputs the corresponding reduced-dose image, which is saved into the sample sets repository. The above-described operations complete the incomplete sample set again. The analytic engine at block 763 verifies whether a last incomplete sample set has been processed. If not, the flow of activity returns to block 760 to repeat the same operations on a next incomplete sample set. Conversely (once all the incomplete sample sets have been processed) the corresponding loop is exited by passing to block 743 for training the operative neural network as above with the sample sets (being completed or provided already completed). This implementation improves the accuracy of the reduced-dose images and then the performance of the operative neural network being trained with them.

With reference again to block 758, the process continues to block 764 wherein the analytic engine verifies whether the configuration of the operative neural has been completed. If not, the process returns to block 702 for repeating the same operations in order to configure the operative neural network for a different increasing factor. Conversely, once the configuration of the operative neural has been completed, the configurations of the operative neural network so obtained are deployed at block 765 to a batch of instances of the control computers of corresponding imaging systems (for example, by preloading them in the factory in case of first delivery of the imaging systems or by uploading them via the network in case of upgrade of the imaging systems). The process then ends to the concentric white/black stop circles 766.

Figure 8A:
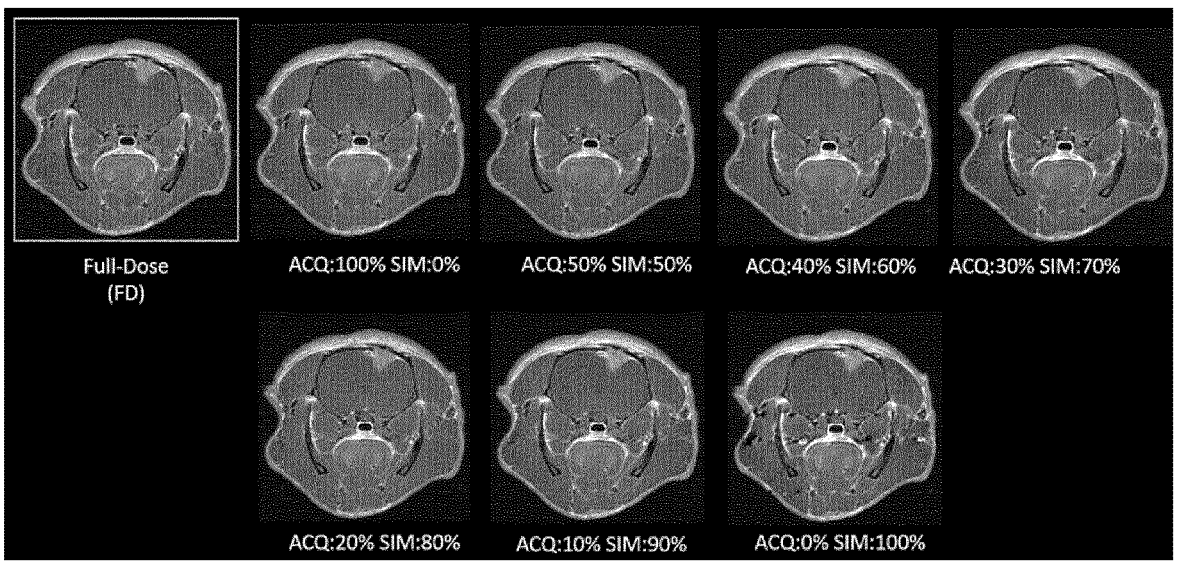
FIG. 8A-FIG. 8B show representative examples of experimental results relating to the solution according to an embodiment of the present disclosure.
Figure 8A:
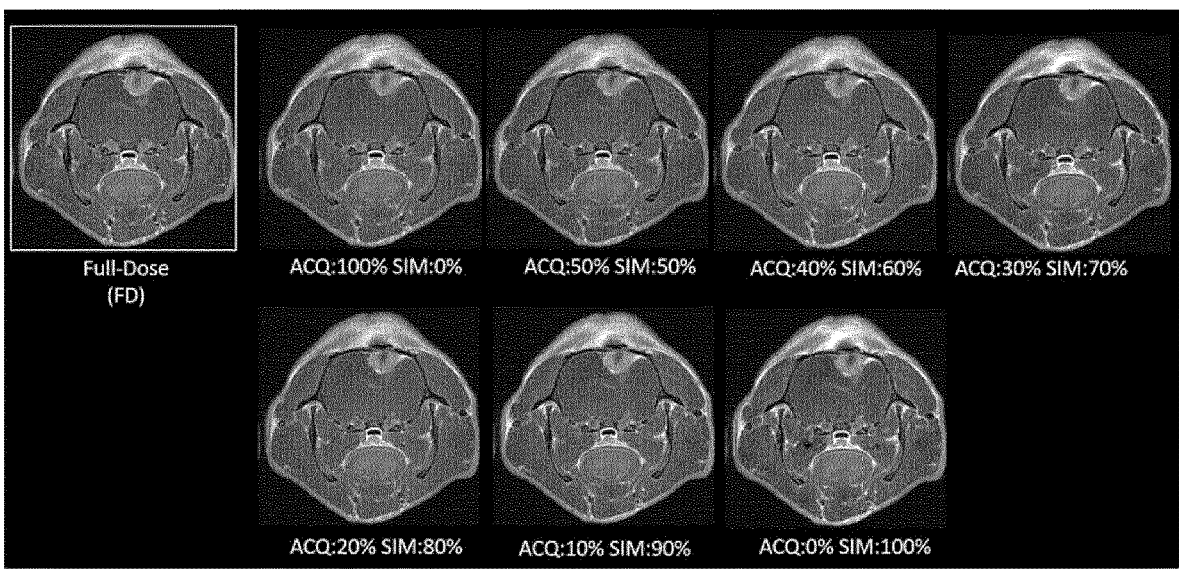
Figure 8B:
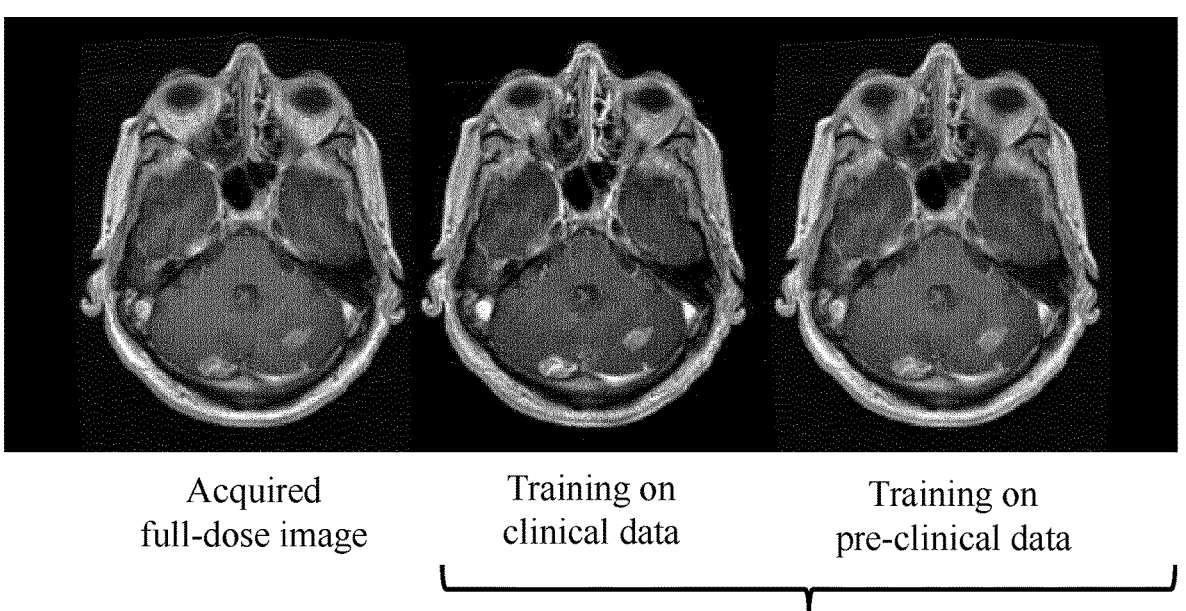
Figure 8B:
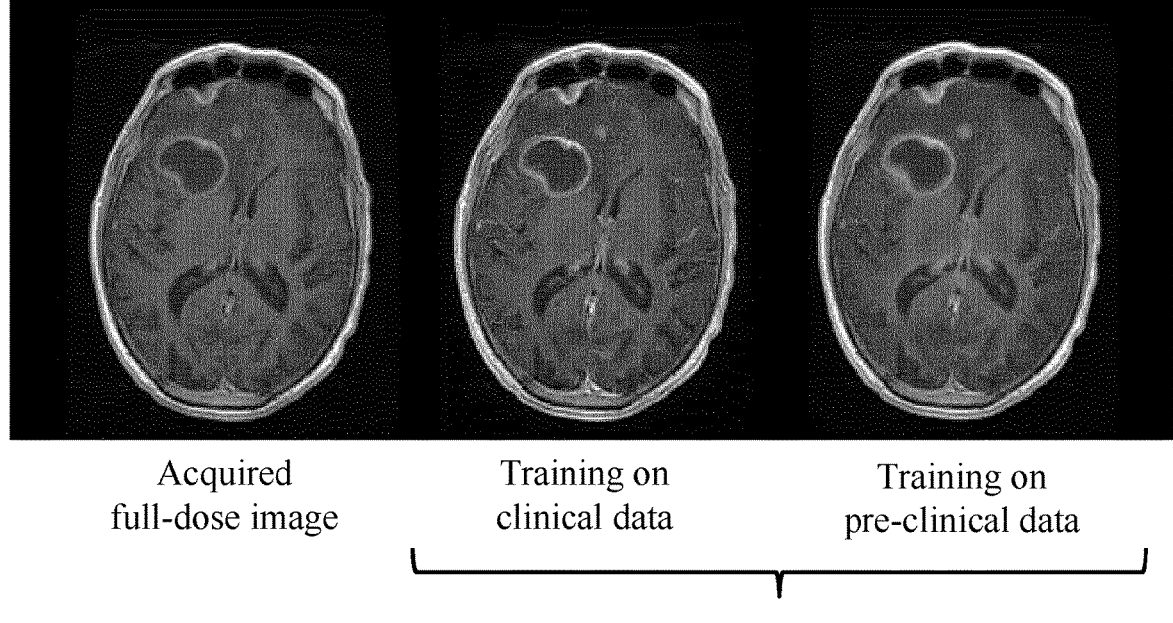

With reference now to FIG. 8A-FIG. 8B, representative examples are shown of experimental results relating to the solution according to an embodiment of the present disclosure.

Particularly, a dedicated pre-clinical study was carried out on rats bearing the following two cerebral lesions (both surgically induced): a C6 glioma tumor (n=36 animals) and a cerebral ischemia pathology (n=42 animals). All the animals underwent a surgical procedure for inducing the lesion. Animals that survived the surgical procedure and which, during the two following weeks (i.e., the time window required for a pathology development of the lesion), showed only limited or none clinical signs, were enrolled for imaging procedures of MRI type (i.e., typically 2 for each animal, 3 only in limited cases). The imaging procedures were carried out using a Gadolinium based contrast agent and a pre-clinical scanner spectrometer Pharmascan by Bruker Corporation (trademarks thereof), that operates at 7T and is equipped with a rat head volume coil with 2 channels. The CE-MR protocol used during the acquisitions was the following:

pre-contrast acquisition of a standard T1-weighted sequence (zero-dose images);

intravenous administration of the contrast agent at a reduced-dose equal to 0.01 mmol Gd/kg;

post-contrast acquisition of a T1-weighted sequence (reduced-dose images);

further intravenous administration of the contrast agent at 0.04 mmol Gd/kg shortly after the previous one so that they sum into a full-dose equal to 0.05 mmol Gd/kg;

post-contrast acquisition of a T1-weighted sequence (full-dose images).

The study led to the acquisition of 130 3D MRI volumes (i.e., 61 on glioma bearing rats and 69 on ischemia bearing rats) each consisting of 24 slices. Acquired volumes were used to build two datasets:

acquired data: it includes only acquired images (zero-dose images, reduced-dose images and full-dose images);

simulated data: it includes (acquired) zero-dose images and full-dose images and corresponding (simulated) reduced-dose images (increasing factor k=5).

Using the full-dose images as ground truth, a total number of 7 (operative) neural networks were trained varying the mixture of acquired/simulated data, i.e., selecting all the possible combinations of the following parameters:

learning rate=0.01 decay=0.001 dataset=mixture of acquired data and simulated data (noise level=0.015 only for simulated data), i.e., 0%, 10%, 20%, 30%, 40%, 50% and 100% of acquired data and 100%, 90%, 80%, 70%, 60%, 50% and 0%, respectively, of simulated data $$LOSS = MAE + ftMAE + VGG19/4$$

relative weights (a,b,c) of composite loss: a=b=c=1.

With reference now to FIG. 8A, representative examples are shown of a full-dose image in its original version (FD) and when simulated by neural networks trained on different mixture of acquired data (ACQ) and simulated data (SIM), with the same gray-scale applied to all the full-dose images. As can be seen, the neural network trained on 100% of acquired data generated full-dose images very similar to the ground truth (i.e., their version as acquired). A progressive moderate deterioration (blurring, artefacts) in the performance of the neural networks was observed increasing the percentage of simulated data during the training (especially for percentages of simulated data equal to or greater than 60%). However, the addition of just 10% of acquired data in the training set seemed to be enough to improve the performance of the corresponding neural networks with removal of the major vanishing artefacts.

In view of the above, the mixture of acquired/simulated images during the training seemed to be a valid strategy to further improve the performance of the neural network. This consideration may be even more significative when extended to datasets with a lower homogeneity. In fact, due its intrinsic homogeneity (same scanner, magnetic field, coil, MRI sequence and so on), the adopted pre-clinical dataset should be not optimal to gather the full potentiality of a mixed (acquired/simulated) training approach.

A further dedicated pre-clinical study was carried out on rats bearing C6 glioma tumor (n=48 animals). All the animals underwent a surgical procedure for inducing the lesion. Animals that survived the surgical procedure and which, during the two following weeks (i.e., the time window required for a pathology development of the lesion), showed only limited or none clinical signs, were enrolled for imaging procedures of MRI type (i.e., typically 3 for each animal). The imaging procedures were carried out using a commercial contrast agent ProHance by Bracco Imaging S.p.A. (trademarks thereof) and two pre-clinical scanner spectrometers: Pharmascan by Bruker Corporation (trademarks thereof) that operates at 7T and is equipped with a rat head volume coil with 2 channels and Biospec by Bruker Corporation (trademarks thereof) that operates at 3T and it is equipped with a rat head surface coil with 4 channels. The CE-MR protocol used during the acquisitions was the following:

pre-contrast acquisition of a standard T1-weighted sequence (zero-dose images);

intravenous administration of a contrast agent at a full-dose equal to 0.1 mmol Gd/kg;

post-contrast acquisition of a T1-weighted sequence (full-dose images); further intravenous administration of the contrast agent at 0.1 mmol Gd/kg shortly after the previous one so that they sum into a boosted-dose equal to 0.2 mmol Gd/kg;

post-contrast acquisition of a T1-weighted sequence (boosted-dose images).

The study led to the acquisition of 122 3D MRI volumes.

An (operative) neural network was trained on these (pre-clinical) data using the boosted-dose images as ground truth, with the following parameters:

learning rate=0.01 decay=0.001

$$LOSS = MAE + ftMAE + VGG19/4$$

relative weights (a,b,c) of composite loss: a=5, b=c=1.

Another (operative) neural network was likewise trained on (clinical) data comprising (acquired) zero-dose images and full-dose images and (simulated) boosted-dose images, so as to optimize its capability of simulating the boosted-dose images from the corresponding zero-dose image and full-dose images.

Once trained, the two neural networks were applied to (clinical) zero-dose image and full-dose images to predict corresponding boosted-dose images, with an increasing factor k=2.

With reference now to FIG. 8B, representative examples are shown of an (acquired) full-dose image and of corresponding boosted-dose images being simulated with the neural network trained on the clinical data and with the neural network trained on the pre-clinical data. As can be seen, both neural networks succeed in boosting the contrast of the full-dose image. Surprisingly, despite the difference in species (human versus murine) the neural network trained on pre-clinical data learned to identify the locations corresponding to enhanced regions and to increment such enhancement.

In view of the above, the use of pre-clinical data is a valid strategy to train the neural network for generating (clinical) boosted images.

Modifications

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for training an operative machine learning model. However, the operative machine learning model may be of any type (for example, a neural network, a generative model, a genetic algorithm and so on).

In an embodiment, the operative machine learning model is for use in medical imaging applications. However, the medical imaging applications may be of any type (see below).

In an embodiment, the method comprises the following steps under the control of a computing system. However, the computing system may be of any type (see below).

In an embodiment, the method comprises providing (to the computing system) a plurality of sample sets. However, the sample sets may be in any number and provided in any way (for example, downloaded over the Internet, such as from the central servers of the health facilities wherein they have been gatherer from the corresponding imaging systems either automatically over the corresponding LANs or manually by means of removable storage units, loaded manually from removable storage units wherein they have been copied, such from the central servers or from (stand-alone) imaging systems and so on) from any number and type of sources (for example, hospitals, clinics, universities, laboratories and so on).

In an embodiment, the sample sets comprise corresponding sample baseline images, sample source images and sample target images. However, the sample sets may be of any type (for example, with all the sample sets to be completed, with some of the sample sets already completed, with the sample sets (to be completed or already completed) that are constructed from image sequences or received already constructed, and so on); moreover, each sample set may comprise any number of sample images (for example, only the sample baseline/source/target images, one or more further sample source images being acquired and/or simulated, such as corresponding to different doses of the contrast agent and/or different acquisition conditions, and so on) of any type (for example, in any form such as magnitude, complex, k-space and the like, with any dimensions, size, resolution, chromaticity, bit depth and the like, relating to any locations of the body-parts, such as voxels, pixels and so on).

In an embodiment, the sample baseline/source/target images are representative of corresponding body-parts of subjects. However, the body-parts may be in any number, of any type (for example, organs, regions thereof, tissues, bones, joints and so on) and in any condition (for example, healthy, pathological with any lesions and so on); moreover, the body-parts may belong to any number and type of subjects (for example, human beings, animals and so on).

In an embodiment, the sample baseline images have been acquired from the corresponding body-parts without contrast agent. However, the sample baseline images may have been acquired in any way (for example, preceding the administration of the contrast agent by any advance, following a possible previous administration of the contrast agent by any delay and so on).

In an embodiment, the sample target images have been acquired from the corresponding body-parts of the subjects to which a contrast agent has been administered at a sample target-dose. However, the contrast agent may be of any type (for example, any targeted contrast agent, such as based on specific or non-specific interactions, any non-targeted contrast agent, and so on) and it may have been administered in any way (for example, intravenously, intramuscularly, orally and so on). In any case, this is a (computer-implemented) data-processing method that is performed independently of the acquisition of the sample images (without requiring any interaction with the corresponding subjects).

In an embodiment, the sample images correspond to a sample-dose of the contrast agent lower than the sample target-dose (with a ratio between the sample source-dose and the sample target-dose equal to a decreasing factor). However, the sample source dose and the sample target dose may have any values, either in absolute of relative terms (for example, with the sample target-dose lower than, equal to or higher than the full-dose of the contrast agent, with the sample source-dose lower or higher than the sample target-dose, and so on) and the sample images may correspond to the sample source-dose in any way (for example, all simulated, in part acquired and so on).

In an embodiment, the method comprises training (by the computing system) the operative machine learning model to optimize a capability thereof to generate the sample target image of each of the sample sets from at least the sample baseline image and the sample source image of the sample set. However, the operative machine learning model may be trained in any way (for example, to optimize its capability to generate the sample target image from the sample baseline image, the sample source image and possibly one or more of the further sample source images, by selecting any training/verification sets from the sample sets, using any algorithm, such as Stochastic Gradient Descent, Real-Time Recurrent Learning, higher-order gradient descent, Extended Kalman-filtering and the like, any loss function, such as based on Mean Absolute Error, Mean Square Error, perceptual loss, adversarial loss and the like, defined at the level of the locations individually or of groups thereof, by taking into account any complementary information, such as condition of the body-parts, type of the subjects and the like, for a fixed increasing factor, for a variable increasing factor being a parameter of the operative machine learning model and so on).

In an embodiment, said step of providing the sample sets comprises receiving (by the computing system) one or more incomplete sample sets of the sample sets each missing the sample source image. However, the incomplete sample sets may be in any number (for example, all the sample sets, only part thereof and so on).

In an embodiment, the method comprises completing (by the computing system) the incomplete sample sets each by simulating the sample source image from the sample baseline image and the sample target image of the sample set, the sample source image being simulated to represent the corresponding body-part of the subject mimicking administration thereto of the contrast agent at the sample source-dose. However, the sample source images may be simulated in any way (for example, operating in any domain, such as magnitude, complex, k-space and the like, analytically with an analytic engine, with an analytic engine that generates a preliminary version of the sample source images, a training machine learning model that is trained with the sample sets so preliminary completed and the training machine learning model being trained that generates a refined version of the sample source images, with a training machine learning model trained with further sample sets being acquired independently, such as from pre-clinical studies on animals, with or without any pre-processing, such as registration, normalization, denoising, distortion correction, filtering of abnormal sample images and the like, with or without any post-processing, such as any normalization, noise injection and so on).

In an embodiment, the training method comprises deploying (by the configuration computing system) the operative machine learning model being trained for use in the medical imaging applications. However, the operative machine learning model may be deployed in any way to any number and type of imaging systems (for example, distributed together with corresponding new imaging systems or for upgrading imaging systems already installed, put online and so on).

In an embodiment, the operative machine learning model is used in the medical imaging applications to mimic an increase of a dose of the contrast agent being administered to corresponding patients according to an increasing factor corresponding to an inverse of the decreasing factor. However, the operative machine learning model may be used to mimic the increase of the dose of the contrast agent in any way (for example, in real-time, off-line, locally, remotely and so on); moreover, the increasing factor may correspond to the inverse of the decreasing factor in any way (for example, equal to it, lower or higher than it, such as according to a corresponding multiplicative factor, and so on).

Further embodiments provide additional advantageous features, which may however be omitted at all in a basic implementation.

In an embodiment, in each of the sample sets the sample target image has been acquired from the corresponding body-part of the subject to which the contrast agent has been administered at a standard full-dose. However, the full-dose may be of any type (for example, for each type of medical imaging applications, fixed, depending on the type of the body-parts, on the type, weight, age and the like of the subjects, and so on). In any case, the possibility is not excluded of using a different sample target-dose (for example, lower or higher than the full-dose).

In an embodiment, one or more of the sample sets are complete sample sets. However, the complete sample sets may be in any number (either in absolute or in relative terms with respect to the incomplete sample sets), down to none.

In an embodiment, the sample source image of each of the complete sample sets has been acquired from the corresponding body-part of the subject to which the contrast agent has been administered at the sample source-dose. However, the sample source images of the complete sample sets may have been acquired in any way from the corresponding body-parts of the subjects to which the contrast agent has been administered in any way (for example, either the same or different with respect to the sample target images).

In an embodiment, at least part of the subjects are animals and the operative machine learning model is for use in the medical imaging applications on human beings. However, the animals may be in any number and of any type (for example, rats, pigs and so on). In any case, the training of the operative machine learning model with sample sets acquired from animals for use in the medical imaging applications applied to human beings is possible more generally even when all the sample sets are received already completed.

In an embodiment, the subjects of the incomplete sample sets are animals and the subjects of the complete sample sets are human beings. However, the sample sets may be collected from animals and human beings in any way (for example, using each of them to collect only the complete sample sets or part thereof, to collect only the incomplete sample sets or part thereof, any combination thereof and so on).

In an embodiment, the operative machine learning model is an operative neural network. However, the operative neural network may be of any type (for example, an auto-encoder, a multi-layer perceptron network, a recurrent network and the like, with any number of layers, connections between layers, receptive field, stride, padding, activation functions and so on).

In an embodiment, each of the sample baseline images, each of the sample source images and each of the sample target images comprise a plurality of sample baseline values, of sample source values and of sample target values, respectively. However, the sample baseline/source/target values may be in any number and of any type (for example, in magnitude/complex form for voxels/pixels, in k-space form and so on).

In an embodiment, said step of completing the incomplete sample sets comprises calculating (by the computing system) each of the sample source values of each of the sample source images by applying a simulation formula depending on the decreasing factor. However, the simulation formula may be of any type (for example, linear, quadratic, cubic, function of the corresponding sample baseline value and/or sample administration value, and so on).

In an embodiment, the simulation formula is derived from a signal law expressing a magnitude of a response signal of the body-parts as a function of a local concentration of the contrast agent. However, the signal law may be of any type (for example, based on any extrinsic/intrinsic acquisition parameters and so on) and the simulation formula may be derived from the signal law in any way (for example, from any reduction of the signal law, the actual signal law and so on).

In an embodiment, the simulation formula is derived from the signal law being linearized with respect to the local concentration of the contrast agent. However, the signal law may be linearized in any way (for example, with any series expansion, any approximation and so on).

In an embodiment, the simulation formula is derived from the signal law by assuming a direct proportionality between the local concentration and a dose of the contrast agent. However, the simulation formula may be derived from the signal law by assuming any relationship between the local concentration and the dose of the contrast agent (for example, linear, non-linear and so on).

In an embodiment, said step of calculating each of the sample source values comprises setting (by the computing system) the sample source value to the corresponding sample baseline value plus the decreasing factor multiplied by a difference between the sample target dose and the sample source dose. However, the use is not excluded of any other (linear/non-linear) simulation formula.

In an embodiment, the sample baseline values, the sample source values and the sample target values are representative of the response signal of corresponding locations of the body-parts. However, the response signal may be represented in any way (for example, in magnitude form, in complex form and so on).

In an embodiment, said step of calculating each of the sample source values comprises modulating (by the computing system) the decreasing factor to be used to calculate the sample source value according to an indication of the local concentration of the contrast agent in the corresponding location derived from the sample target image. However, the local concentration may be derived in any way (for example, set to the corresponding local contrast enhancement, calculated from the sample target value according to the signal law and so on) and the decreasing factor may be modulated according to any linear/non-linear function thereof (down to be maintained always the same).

In an embodiment, said step of modulating the decreasing factor being used to calculate the sample source value comprises incrementing (by the computing system) the decreasing factor linearly according to a local contrast enhancement of the corresponding location depending on a difference between the corresponding sample target value and sample baseline value. However, the decreasing factor may be incremented linearly according to any modulation factor (for example, determined empirically, calculated by using average/local values of any acquisition parameters, and so on).

In an embodiment, said completing the incomplete sample sets comprises injecting (by the computing system) an artificial noise into the sample source image of each of the incomplete sample sets. However, the artificial noise may be of any type (for example, depending on the decreasing factor, fixed, and so on) and it may be injected into the sample source image in any way (for example, in additive form, in multiplicative form, in convolutional form, into the sample source image in magnitude form, in complex form, in k-space form, everywhere, only where the contrast agent is present and so on), down to none.

In an embodiment, the artificial noise has a statistical distribution depending on the decreasing factor. However, the statistical distribution of the artificial noise may be of any type (for example, of normal, Rayleigh, Rician, and so on type); moreover, the statistical distribution of the artificial noise may depend on the decreasing factor in any way (for example, on any linear/non-linear function of the decreasing factor determined using a theoretical approach, with the obtained result that is corrected heuristically, and so on).

In an embodiment, said injecting the artificial noise into the sample source image comprises calculating (by the computing system) corresponding reference values of one or more statistical parameters of a reference noise based on a noise of the corresponding sample baseline image and/or sample target image. However, the statistical parameters may in any number and of any type (for example, standard deviation, variance, skewness and so on) and their reference values may be calculated in any way (for example, from the noise of the sample baseline image and the noise of the sample target image, such as from an average of corresponding values, only from the noise of the sample baseline image, only from the noise of the sample target image and so on).

In an embodiment, said injecting the artificial noise into the sample source image comprises calculating (by the configuration computing system) corresponding artificial values of the statistical parameters of the artificial noise required to make a statistical distribution of a noise of the sample source mage matching the statistical distribution of the reference noise. However, the artificial values may be calculated according to any linear/non-linear function of the corresponding reference values.

In an embodiment, said step of injecting the artificial noise into the sample source image comprises generating (by the computing system) the artificial noise randomly to have a statistical distribution with the artificial values of the statistical parameters. However, the artificial noise may be generated in any way (for example, with any random or pseudo-random generator, and so on).

In an embodiment, the statistical parameters comprise a standard deviation, said step of injecting the artificial noise into the sample source image comprising setting (by the computing system) the artificial value of the standard deviation to the reference value of the standard deviation multiplied by a square root of twice the decreasing factor multiplied by a difference between one and the decreasing factor. However, the possibility is not excluded of using a different formula.

In an embodiment, said step of calculating the artificial values of the statistical parameters comprises correcting (by the computing system) the artificial values of the statistical parameters according to corresponding empirical corrections. However, the empirical corrections may be of any type (for example, the same for all the statistical parameters, different for each statistical parameter and so on) and they may be used to correct the corresponding artificial values in any way (for example, by incrementing/decrementing them, according to any linear/non-linear function and so on).

In an embodiment, said step of injecting the artificial noise into the sample source image comprises generating (by the computing system) the artificial noise randomly to have the statistical distribution of normal type with a zero mean. However, the possibility is not excluded of generating the artificial noise with a different type of statistical distribution and a different mean.

In an embodiment, said step of injecting the artificial noise into the sample source image comprises adding (by the computing system) the artificial noise to the sample source image. However, the artificial noise may be injected in additive form in any way (for example, at the level of each cell, group of cells of the sample source image in any form and so on).

In an embodiment, said step of injecting the artificial noise into the sample source image comprises generating (by the computing system) the artificial noise randomly to have the statistical distribution of normal type with a unitary mean. However, the possibility is not excluded of generating the artificial noise with a different type of statistical distribution and a different mean.

In an embodiment, said step of injecting the artificial noise into the sample source image comprises multiplying (by the computing system) the sample source image by the artificial noise. However, the artificial noise may be injected in multiplicative form in any way (for example, at the level of each cell, group of cells of the sample source image in any form and so on).

In an embodiment, said step of injecting the artificial noise into the sample source image comprises convolving (by the computing system) the sample source image through the artificial noise. However, the artificial noise may be injected in convolutional form in any way (for example, at the level of each cell, group of cells of the sample source image in any form, in circular or non-circular way with any stride, padding and so on).

In an embodiment, the training method comprises denoising (by the configuration computing system) the sample baseline image and the sample target image of each of the incomplete sample sets to be used to simulate the corresponding sample source image. However, the sample baseline/target images may be denoised in any way (for example, with an autoencoder, analytic techniques based on block-matching, shrinkage fields, Wavelet transform, smoothing filters and so on), down to none.

In an embodiment, said step of completing the incomplete sample sets comprises training (by the computing system) a training machine learning model to optimize a capability thereof to generate the sample source image of each of the sample sets from the corresponding sample baseline image and sample target image. However, the training machine learning model may be of any type and it may be trained in any way (for example, either the same or different with respect to the operative machine learning model) by using any sample sets (for example, all of them after the completion of the incomplete sample sets analytically, only the complete sample sets and so on).

In an embodiment, said completing the incomplete sample sets comprises generating (by the computing system) a refined version of the sample source image of each of the incomplete sample sets by applying the sample baseline image and the sample target image of the incomplete sample set to the training machine learning model being trained. However, the possibility is not excluded of using the training machine learning model in a different way (for example, to refine the sample source images of the incomplete sample sets, to generate them directly and so on).

In an embodiment, the training machine learning model is a training neural network. However, the training neural network maybe of any type (for example, either the same or different with respect to the operative neural network).

In an embodiment, the method comprises repeating (by the computing system) said step of completing the incomplete sample sets and said step of training the operative machine learning model for a plurality of values of the decreasing factor. However, the values of the decreasing factor may be in any number and of any type (for example, distributed uniformly, with variable pitch, such as decrementing for incrementing values, and so on) and these steps may be repeated in any way (for example, consecutively, at different times and so on).

In an embodiment, the method comprises deploying (by the computing system) the operative machine learning model in corresponding configurations being trained with the values of the decreasing factor for selecting one or more corresponding values of the increasing factor in each of the medical imaging applications. However, the different configurations may be deployed in any way (for example, all together, added over time and so on) and in any form (for example, corresponding configurations of a single operative machine learning model, corresponding instances of the operative machine learning model and so on) and they may be used for selecting the values of the increasing factor in any number and in any way (for example, in discrete mode, in continuous mode, either the same or different with respect to the values of the decreasing factor, and so on).

In an embodiment, the method comprises expanding (by the computing system) each of the sample sets by simulating one or more further sample source images from the sample baseline image and the sample target image of the sample set for corresponding further sample source-doses of the contrast agent. However, the further sample source images may be in any number and corresponding to any further sample source doses (down to none), and they may be simulated in any way (for example, either the same or different with respect to the sample source image).

In an embodiment, the method comprises using the operative machine learning model being trained in each of the medical imaging applications for imaging a corresponding further body-part of a patient. However, the further the body-part may be of any type, in any condition and it may belong to any patient (for example, ether the same or different with respect to the body-parts of the subjects being used to train the operative machine learning model); moreover, the method may be used in any medical imaging application (for example, diagnostic, therapeutic or surgical applications, based on MRI, CT, fluoroscopy, fluorescence or ultrasound techniques, and so on). In any case, although the method may facilitate the task of a physician, it only provides intermediate results that may help him/her but with the medical activity stricto sensu that is always made by the physician himself/herself.

In an embodiment, the method comprises receiving (by the computing system) an operative baseline image and one or more operative administration images being representative of the further body-part of the patient. However, the operative administration images may be in any number and the operative baseline/administration images may be of any type (for example, either the same or different with respect to the sample images); moreover, the operative baseline/administration images may be received in any way (for example, in real-time, off-line, locally, remotely and so on).

In an embodiment, the operative administration images have been acquired from the further body-part of the patient to which the contrast agent has been administered at an operative administration-dose. However, the contrast agent may have been administered to the patient in any manner, comprising in a non-invasive manner (for example, orally for imaging the gastrointestinal tract, via a nebulizer into the airways, via topical spray application) and in any case without any substantial physical intervention on the patient that would require professional medical expertise or entail any health risk for him/her (for example, intramuscularly); moreover, the operative administration-dose may have any value (for example, either the same as or different from the sample source-dose, lower than, equal to or higher than the full-dose of the contrast agent, and so on).

In an embodiment, the method comprises simulating (by the computing system) corresponding operative simulated images from the operative baseline image and the operative administration images with the machine learning model being trained. However, the operative simulated images may be simulated in any way (for example, operating in any domain, such as magnitude, complex, k-space and the like, in real-time, off-line, locally, remotely and so on), starting from the operative baseline image being acquired from the body-part without contrast agent or with administration of the contrast agent at a dose different from the operative administration-dose and/or under different acquisition conditions.

In an embodiment, the operative simulation images are representative of the further body-part of the patient mimicking administration thereto of the contrast agent at an operative simulation-dose higher than the operative administration-dose (with a ratio between the operative simulation-dose and the operative administration-dose corresponding to the increasing factor). However, the operative simulation-dose may have any value (for example, either the same as or different from the sample target-dose, lower than, equal to or higher than the full-dose of the contrast agent, and so on), with the ratio between the operative simulation-dose and the operative administration-dose corresponding to the increasing factor in any way (for example, equal to it, lower or higher than it, such as according to a corresponding multiplicative factor, and so on).

In an embodiment, the method comprises outputting (by the computing system) a representation of the body-part based on the operative simulation images. However, the representation of the body-part may be of any type (for example, the operative simulation images, the corresponding operative combined images and so on) and it may be output in any way (for example, displayed on any device, such as a monitor, virtual reality glasses and the like, or more generally output in real-time or off-line in any way, such as printed, transmitted remotely and so on).

Generally, similar considerations apply if the same solution is implemented with equivalent methods (by using similar steps with the same functions of more steps or portions thereof, removing some steps being non-essential, or adding further optional steps); moreover, the steps may be performed in a different order, concurrently or in an interleaved way (at least in part).

An embodiment provides a computer program, which is configured for causing a computing system to perform the above-mentioned method when the computer program is executed on the computing system. An embodiment provides a computer program product, which comprises a computer readable storage medium embodying a computer program, the computer program being loadable into a working memory of a computing system thereby configuring the computing system to perform the same method. However, the (computer) program may be executed on any computing system (see below). The program may be implemented as a stand-alone module, as a plug-in for a pre-existing software program (for example, a configuration application, an imaging application and so on) or even directly in the latter.

Generally, similar considerations apply if the program is structured in a different way, or if additional modules or functions are provided; likewise, the memory structures may be of other types or may be replaced with equivalent entities (not necessarily consisting of physical storage media). The program may take any form suitable to be used by the computing system, thereby configuring the computing system to perform the desired operations; particularly, the program may be in the form of external or resident software, firmware, or microcode (either in object code or in source code, for example, to be compiled or interpreted). Moreover, it is possible to provide the program on any computer readable storage medium. The storage medium is any tangible medium (different from transitory signals per se) that may retain and store instructions for use by the computing system. For example, the storage medium may be of the electronic, magnetic, optical, electromagnetic, infrared, or semiconductor type; examples of such storage medium are fixed disks (where the program may be pre-loaded), removable disks, memory keys (for example, of USB type) and the like. The program may be downloaded to the computing system from the storage medium or via a network (for example, the Internet, a wide area network and/or a local area network comprising transmission cables, optical fibers, wireless connections, network devices); one or more network adapters in the computing system receive the program from the network and forward it for storage into one or more storage devices of the computing system. In any case, the solution according to an embodiment of the present disclosure lends itself to be implemented even with a hardware structure (for example, by electronic circuits integrated in one or more chips of semiconductor material, such as of Field Programmable Gate Array (FPGA) or Application-Specific Integrated Circuit (ASIC) type), or with a combination of software and hardware suitably programmed or otherwise configured.

An embodiment provides a computing system, which comprises means configured for performing the steps of the method of above. An embodiment provides a computing system comprising a circuit (i.e., any hardware suitably configured, for example, by software) for performing each step of the same method. However, the computing system may be of any type (for example, only the configuration computing system, the configuration computing system and the control computing system, a common computing system providing the functionalities of both of them and so on) and at any location (for example, on premise in case of a server, a virtual machine and the like controlling a plurality of scanners, remotely in case of its implementation by a service provider offering a corresponding service of cloud type, SOA type and the like for a plurality of scanners, locally in case of a control computer separate from the corresponding scanner, a control unit of the scanner and so on).

Generally, similar considerations apply if the computing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method controlled by a computing system, the method for training an operative machine learning model for use in medical imaging applications, wherein the method comprises:

providing to the computing system, a plurality of sample sets comprising corresponding sample baseline images, sample source images and sample target images being representative of corresponding body parts of subjects, the sample baseline images being acquired from the corresponding body parts without contrast agent, the sample target images being acquired from the corresponding body parts of the subjects to which a contrast agent has been administered at a sample target dose and the sample source images corresponding to a sample dese of the contrast agent lower than the sample target dose with a ratio between the sample source dose and the sample target dose equal to a decreasing factor, training by the computing system, the operative machine learning model to optimize a capability thereof to generate the sample target image of each of the sample sets from at least the sample baseline image and the sample source image of the sample set, and deploying, by the computing system, the operative machine learning model being trained for use in the medical imaging applications to mimic an increase of a dose of the contrast agent being administered to corresponding patients according to an increasing factor corresponding to an inverse of the decreasing factor, wherein said providing the sample sets comprises:

receiving, by the computing system, one or more incomplete sample sets of the sample sets each missing the sample source image, and completing, by the computing system, the incomplete sample sets each by simulating the sample source image from the sample baseline image and the sample target image of the sample set, the sample source image being simulated to represent the corresponding body part of the subject mimicking administration thereto of the contrast agent at the sample source dose.

2. The method according to claim 1, wherein in each of the sample sets the sample target image has been acquired from the corresponding body part of the subject to which the contrast agent has been administered at a standard full dose.

3. The method according to claim 1, wherein one or more of the sample sets are complete sample sets, the sample source image of each of the complete sample sets being acquired from the corresponding body part of the subject to which the contrast agent has been administered at the sample source dose.

4. The method according to claim 1, wherein at least part of the subjects are animals and the operative machine learning model is for use in the medical imaging applications on human beings.

5. The method according to claim 1, wherein each of the sample baseline images, each of the sample source images, and each of the sample target images comprise a plurality of sample baseline values, of sample source values, and of sample target values, respectively, said completing the incomplete sample sets comprising:

calculating, by the computing system, each of the sample source values of each of the sample source images by applying a simulation formula depending on the decreasing factor, the simulation formula being derived from a signal law expressing a magnitude of a response signal of the body parts as a function of a local concentration of the contrast agent.

6. The method according to claim 5, wherein the simulation formula is derived from the signal law being linearized with respect to the local concentration of the contrast agent.

7. The method according to claim 5, wherein the simulation formula is derived from the signal law by assuming a direct proportionality between the local concentration and a dose of the contrast agent.

8. The method according to claim 5, wherein the sample baseline values, the sample source values and the sample target values are representative of the response signal of corresponding locations of the body parts, and wherein said calculating each of the sample source values comprises:

modulating, by the computing system, the decreasing factor to be used to calculate the sample source value according to an indication of the local concentration of the contrast agent in the corresponding location derived from the sample target image.

9. The method according to claim 8, wherein said modulating the decreasing factor being used to calculate the sample source value comprises:

incrementing, by the computing system, the decreasing factor linearly according to a local contrast enhancement of the corresponding location depending on a difference between the corresponding sample target value and sample baseline value.

10. The method according to claim 1, wherein said completing the incomplete sample sets comprises:

injecting, by the computing system, an artificial noise into the sample source image of each of the incomplete sample sets, the artificial noise having a statistical distribution depending on the decreasing factor.

11. The method according to claim 10, wherein said injecting the artificial noise into the sample source image comprises:

calculating, by the computing system, corresponding reference values of one or more statistical parameters of a reference noise based on a noise of the corresponding sample baseline image and/or sample target image, calculating, by the computing system, corresponding artificial values of the statistical parameters of the artificial noise required to make a statistical distribution of a noise of the sample source image matching a statistical distribution of the reference noise, and generating, by the computing system, the artificial noise randomly to have a statistical distribution with the artificial values of the statistical parameters.

12. The method according to claim 10, wherein said injecting the artificial noise into the sample source image comprises:

generating, by the computing system, the artificial noise randomly to have the statistical distribution of normal type with a zero mean, and adding, by the computing system, the artificial noise to the sample source image.

13. The method according to claim 10, wherein said injecting the artificial noise into the sample source image comprises:

generating, by the computing system, the artificial noise randomly to have the statistical distribution of normal type with unitary mean, and multiplying, by the computing system, the sample source image by the artificial noise or convolving, by the computing system, the sample source image through the artificial noise.

14. The method according to claim 1, further comprising:

denoising, by the computing system, the sample baseline image and the sample target image of each of the incomplete sample sets to be used to simulate the corresponding sample source image.

15. The method according to claim 1, wherein said completing the incomplete sample sets comprises:

training, by the computing system, a training machine learning model to optimize a capability thereof to generate the sample source image of each of the sample sets from the corresponding sample baseline image and sample target image, and generating, by the computing system, a refined version of the sample source image of each of the incomplete sample sets by applying the sample baseline image and the sample target image of the incomplete sample set to the training machine learning model being trained.

16. The method according to claim 1, wherein the method comprises:

repeating, by the computing system, said completing the incomplete sample sets and said training the operative machine learning model for a plurality of values of the decreasing factor, and deploying, by the computing system, the operative machine learning model in corresponding configurations being trained with the values of the decreasing factor for selecting one or more corresponding values of the increasing factor in each of the medical imaging applications.

17. The method according to claim 1, further comprising:

expanding, by the computing system, each of the sample sets by simulating one or more further sample source images from the sample baseline image and the sample target image of the sample set for corresponding further sample source doses of the contrast agent.

18. The method according to claim 1, wherein the method comprises using the machine learning model being trained in each of the medical imaging applications for imaging a corresponding further body part of a patient by:

receiving, by the computing system, an operative baseline image and one or more operative administration images being representative of the further body part of the patient, the operative administration images being acquired from the further body part of the patient to which the contrast agent has been administered at an operative administration dose, simulating, by the computing system, corresponding operative simulated images from the operative baseline image and the operative administration images with the machine learning model being trained, wherein the operative simulation images are representative of the further body part of the patient mimicking administration thereto of the contrast agent at an operative simulation dose higher than the operative administration dose with a ratio between the operative simulation dose and the operative administration dose corresponding to the increasing factor, and outputting, by the computing system, a representation of the body part based on the operative simulation images.

19. A computer program product comprising a tangible, non-transitory computer-readable storage medium embodying a computer program, the computer program being loadable into a working memory of a computing system thereby configuring the computing system to perform a method for training an operative machine learning model for use in medical imaging applications, wherein the method comprises:

providing, to the computing system, a plurality of sample sets comprising corresponding sample baseline images, sample source images and sample target images being representative of corresponding body parts of subjects, the sample baseline images being acquired from the corresponding body parts without contrast agent, the sample target images being acquired from the corresponding body parts of the subjects to which a contrast agent has been administered at a sample target dose and the sample source images corresponding to a sample dose of the contrast agent lower than the sample target dose with a ratio between the sample source dose and the sample targe dose equal to a decreasing factor, training, by the computing system, the operative machine learning model to optimize a capability thereof to generate the sample target image of each of the sample sets from at least the sample baseline image and the sample source image of the sample set, and deploying, by the computing system, the operative machine learning model being trained for use in the medical imaging applications to mimic an increase of a dose of the contrast agent being administered to corresponding patients according to an increasing factor corresponding to an inverse of the decreasing factor, wherein said providing the sample sets comprises:

receiving, by the computing system, one or more incomplete sample sets of the sample sets each missing the sample source image, and completing, by the computing system, the incomplete sample sets each by simulating the sample source image from the sample baseline image and the sample target image of the sample set, the sample source image being simulated to represent the corresponding body part of the subject mimicking administration thereto of the contrast agent at the sample source dosese.

20. A computing system for training an operative machine learning model for use in medical imaging applications, wherein the computing system comprises:

collector circuitry for providing a plurality of sample sets comprising corresponding sample baseline images, sample source images and sample target images being representative of corresponding body-parts of subjects, the sample baseline images being acquired from the corresponding body-parts without contrast agent, the sample target images being acquired from the corresponding body-parts of the subjects to which a contrast agent has been administered at a sample target-dose and the sample source images corresponding to a sample-dose of the contrast agent lower than the sample target-dose with a ratio between the sample source-dose and the sample target-dose equal to a decreasing factor, and training-engine circuitry for training the operative machine learning model to optimize a capability thereof to generate the sample target image of each of the sample sets from at least the sample baseline image and the sample source image of the sample set, and for deploying the operative machine learning model being trained for use in the medical imaging applications to mimic an increase of a dose of the contrast agent being administered to corresponding patients according to an increasing factor corresponding to an inverse of the decreasing factor, wherein the collector circuitry:

is configured for receiving one or more incomplete sample sets of the sample sets each missing the sample source image, and comprises analytic-engine circuitry for completing the incomplete sample sets each by simulating the sample source image from the sample baseline image and the sample target image of the sample set, the sample source image being simulated to represent the corresponding body part of the subject mimicking administration thereto of the contrast agent at the sample source dose.

\* \* \* \* \*